(12) United States Patent
Bates et al.

(10) Patent No.: US 11,728,907 B2
(45) Date of Patent: Aug. 15, 2023

(54) PLAYBACK DEVICE MEDIA ITEM REPLACEMENT

(71) Applicant: Sonos, Inc., Santa Barbara, CA (US)

(72) Inventors: Paul Andrew Bates, Santa Barbara, CA (US); Steven Beckhardt, Boston, MA (US); Jonathon Reilly, Cambridge, MA (US)

(73) Assignee: Sonos, Inc., Santa Barbara, CA (US)

( * ) Notice: Subject to any disclaimer, the term of this patent is extended or adjusted under 35 U.S.C. 154(b) by 0 days.

(21) Appl. No.: 17/659,773

(22) Filed: Apr. 19, 2022

(65) Prior Publication Data

US 2022/0377123 A1 Nov. 24, 2022

Related U.S. Application Data

(63) Continuation of application No. 16/995,422, filed on Aug. 17, 2020, now Pat. No. 11,316,595, which is a (Continued)

(51) Int. Cl.
*H04N 21/436* (2011.01)
*H04L 65/80* (2022.01)
(Continued)

(52) U.S. Cl.
CPC ............ *H04B 17/00* (2013.01); *H04L 65/61* (2022.05); *H04L 65/612* (2022.05);
(Continued)

(58) Field of Classification Search
CPC ....... H04B 17/00; H04L 65/61; H04L 65/612; H04L 65/762; H04L 65/80; H04L 67/60;
(Continued)

(56) References Cited

U.S. PATENT DOCUMENTS 5,440,644 A 8/1995 Farinelli et al.
5,761,320 A 6/1998 Farinelli et al.
(Continued)

FOREIGN PATENT DOCUMENTS

CN 101529867 A 9/2009
CN 102171687 A 8/2011
(Continued)

OTHER PUBLICATIONS

AudioTron Quick Start Guide, Version 1.0, Mar. 2001, 24 pages.
(Continued)

*Primary Examiner* — Jonathan A Bui
(74) *Attorney, Agent, or Firm* — Fortem IP LLP; Benjamin Urban

(57) ABSTRACT

Embodiments are provided for replacing media items in a queue of a playback device. An example implementation involves receiving, at the playback device, first data indicating an addition of a first media item to a queue. The playback device determines that the first media item is no longer accessible to the playback device at a later second time. The playback device initiates a query for a media item similar to the first media item and receives second data indicating that a second media item has replaced the first media item in the queue, the second media item being similar to the first media item. In response, the playback device initiates playback of the second media item on the playback device.

20 Claims, 11 Drawing Sheets

Related U.S. Application Data continuation of application No. 16/143,336, filed on Sep. 26, 2018, now Pat. No. 10,749,613, which is a continuation of application No. 15/713,620, filed on Sep. 23, 2017, now Pat. No. 10,097,601, which is a continuation of application No. 15/357,605, filed on Nov. 21, 2016, now Pat. No. 9,774,643, which is a continuation of application No. 15/056,585, filed on Feb. 29, 2016, now Pat. No. 9,537,915, which is a continuation of application No. 13/693,243, filed on Dec. 4, 2012, now Pat. No. 9,319,153.

(51) Int. Cl.

| | | |
|---|---|---|
| *H04N 21/262* | (2011.01) | |
| *H04N 21/414* | (2011.01) | |
| *H04N 21/482* | (2011.01) | |
| *H04N 21/81* | (2011.01) | |
| *H04L 65/61* | (2022.01) | |
| *H04L 65/75* | (2022.01) | |
| *H04L 67/60* | (2022.01) | |
| *H04L 65/612* | (2022.01) | |
| *H04B 17/00* | (2015.01) | |

(52) U.S. Cl.
CPC ............ *H04L 65/762* (2022.05); *H04L 65/80* (2013.01); *H04L 67/60* (2022.05); *H04N 21/26258* (2013.01); *H04N 21/41407* (2013.01); *H04N 21/43615* (2013.01); *H04N 21/4825* (2013.01); *H04N 21/8113* (2013.01)

(58) Field of Classification Search
CPC ....... H04N 21/26258; H04N 21/41407; H04N 21/43615; H04N 21/4825; H04N 21/8113
See application file for complete search history.

(56) References Cited

U.S. PATENT DOCUMENTS

| | | | |
|---|---|---|---|
| 5,923,902 | A | 7/1999 | Inagaki |
| 6,032,202 | A | 2/2000 | Lea et al. |
| 6,256,554 | B1 | 7/2001 | DiLorenzo |
| 6,404,811 | B1 | 6/2002 | Cvetko et al. |
| 6,469,633 | B1 | 10/2002 | Wachter |
| 6,522,886 | B1 | 2/2003 | Youngs et al. |
| 6,611,537 | B1 | 8/2003 | Edens et al. |
| 6,631,410 | B1 | 10/2003 | Kowalski et al. |
| 6,757,517 | B2 | 6/2004 | Chang |
| 6,778,869 | B2 | 8/2004 | Champion |
| 7,130,608 | B2 | 10/2006 | Hollstrom et al. |
| 7,130,616 | B2 | 10/2006 | Janik |
| 7,143,939 | B2 | 12/2006 | Henzerling |
| 7,236,773 | B2 | 6/2007 | Thomas |
| 7,295,548 | B2 | 11/2007 | Blank et al. |
| 7,391,791 | B2 | 6/2008 | Balassanian et al. |
| 7,483,538 | B2 | 1/2009 | McCarty et al. |
| 7,496,623 | B2 | 2/2009 | Szeto et al. |
| 7,496,633 | B2 | 2/2009 | Szeto et al. |
| 7,571,014 | B1 | 8/2009 | Lambourne et al. |
| 7,630,501 | B2 | 12/2009 | Blank et al. |
| 7,643,894 | B2 | 1/2010 | Braithwaite et al. |
| 7,657,910 | B1 | 2/2010 | McAulay et al. |
| 7,725,533 | B2 | 5/2010 | Szeto et al. |
| 7,725,551 | B2 | 5/2010 | Szeto et al. |
| 7,853,341 | B2 | 12/2010 | McCarty et al. |
| 7,987,294 | B2 | 7/2011 | Bryce et al. |
| 8,014,423 | B2 | 9/2011 | Thaler et al. |
| 8,045,952 | B2 | 10/2011 | Qureshey et al. |
| 8,103,009 | B2 | 1/2012 | McCarty et al. |
| 8,234,395 | B2 | 7/2012 | Millington |
| 8,483,853 | B1 | 7/2013 | Lambourne |
| 8,930,354 | B2 * | 1/2015 | Lewin .................. G06F 16/438 |
| | | | 707/723 |
| 8,942,252 | B2 | 1/2015 | Balassanian et al. |
| 9,507,780 | B2 | 11/2016 | Rothkopf et al. |
| 10,275,135 | B2 | 4/2019 | Coburn, IV et al. |
| 2001/0042107 | A1 | 11/2001 | Palm |
| 2002/0022453 | A1 | 2/2002 | Balog et al. |
| 2002/0026442 | A1 | 2/2002 | Lipscomb et al. |
| 2002/0124097 | A1 | 9/2002 | Isely et al. |
| 2003/0157951 | A1 | 8/2003 | Hasty, Jr. |
| 2004/0024478 | A1 | 2/2004 | Hans et al. |
| 2004/0193609 | A1 | 9/2004 | Phan et al. |
| 2006/0017397 | A1 | 1/2006 | Estabrook |
| 2006/0173974 | A1 | 8/2006 | Tang |
| 2007/0138254 | A1 | 6/2007 | Frendo et al. |
| 2007/0142944 | A1 | 6/2007 | Goldberg et al. |
| 2008/0052371 | A1 | 2/2008 | Partovi et al. |
| 2008/0177822 | A1 | 7/2008 | Yoneda |
| 2008/0201751 | A1 | 8/2008 | Ahmed et al. |
| 2008/0209021 | A1 | 8/2008 | Shamma |
| 2009/0006542 | A1 * | 1/2009 | Feldman .............. G06Q 50/184 |
| | | | 707/999.2 |
| 2009/0183060 | A1 | 7/2009 | Heller et al. |
| 2010/0023865 | A1 | 1/2010 | Fulker et al. |
| 2010/0095332 | A1 | 4/2010 | Gran et al. |
| 2011/0035466 | A1 | 2/2011 | Panigrahi |
| 2011/0131520 | A1 | 6/2011 | Al-Shaykh et al. |
| 2011/0314497 | A1 | 12/2011 | Warrick et al. |
| 2011/0320626 | A1 | 12/2011 | Wong et al. |
| 2012/0206623 | A1 | 8/2012 | Nakama |
| 2012/0220223 | A1 | 8/2012 | Rose et al. |
| 2012/0233644 | A1 | 9/2012 | Rao |
| 2013/0076651 | A1 | 3/2013 | Reimann et al. |
| 2013/0191749 | A1 | 7/2013 | Coburn, IV et al. |
| 2013/0318205 | A1 | 11/2013 | N et al. |
| 2014/0052774 | A1 | 2/2014 | Pollack et al. |
| 2014/0154993 | A1 | 6/2014 | Bates et al. |
| 2015/0181336 | A1 | 6/2015 | Kallai et al. |
| 2016/0216939 | A1 | 7/2016 | Millington |
| 2019/0052372 | A1 | 2/2019 | Bates et al. |
| 2019/0303094 | A1 | 10/2019 | Reimann et al. |
| 2019/0340196 | A1 * | 11/2019 | Rothkopf ............ G06F 16/4387 |
| 2020/0094150 | A1 | 3/2020 | Miura et al. |
| 2021/0271351 | A1 | 9/2021 | Reimann et al. |
| 2021/0349684 | A1 | 11/2021 | Lang |

FOREIGN PATENT DOCUMENTS

| | | |
|---|---|---|
| EP | 1389853 A1 | 2/2004 |
| EP | 2264999 A1 | 12/2010 |
| EP | 2334059 A1 | 6/2011 |
| JP | 2004348455 A | 12/2004 |
| KR | 20100071724 | 6/2010 |
| KR | 20100134164 | 12/2010 |
| KR | 20110064635 | 6/2011 |
| WO | 200153994 | 7/2001 |
| WO | 2003093950 A2 | 11/2003 |
| WO | 2012106269 | 8/2012 |

OTHER PUBLICATIONS

AudioTron Reference Manual, Version 3.0, May 2002, 70 pages.
AudioTron Setup Guide, Version 3.0, May 2002, 38 pages.
Bluetooth. "Specification of the Bluetooth System: The ad hoc Scatternet for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Chinese Patent Office, Chinese Office Action with Translation dated Jul. 31, 2017, issued in connection with Chinese Application No. 201380072032.6, 21 pages.
Chinese Patent Office, First Office Action and Translation dated Apr. 26, 2021, issued in connection with Chinese Application No. 201910443272.1, 17 pages.
Chinese Patent Office, Second Office Action dated Apr. 4, 2018, issued in connection with Chinese Application No. 201380072032.6, 8 pages.
Chinese Patent Office, Third Office Action dated Oct. 16, 2018, issued in connection with Chinese Application No. 201380072032.6, 7 pages.

(56) References Cited

OTHER PUBLICATIONS

Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
European Patent Office, European Extended Search Repor dated Aug. 12, 2015, issued in connection with European Application No. 13861006.8, 9 pages.
European Patent Office, European Office Action dated Sep. 29, 2017, issued in connection with EP Application No. 13861006.8, 7 pages.
European Patent Office, Summons to Attend Oral Proceedings mailed on Jun. 6, 2018, issued in connection with European Application No. 13861006.8, 11 pages.
International Bureau, International Preliminary Report on Patentability, dated Jun. 18, 2015, issued in connection with International Application No. PCT/US2013/072870, filed on Dec. 3, 2013, 6 pages.
International Searching Authority, International Search Report dated Mar. 3, 2014, issued in connection with International Application No. PCT/US2013/072870, filed on Dec. 3, 2013, 3 pages.
International Searching Authority, Written Opinion dated Mar. 3, 2014, issued in connection with International Application No. PCT/US2013/072870, filed on Dec. 3, 2013, 4 pages.
Japanese Patent Office, Japanese Office Action dated Aug. 16, 2016, issued in connection with Japanese Application No. 2015-545515, 6 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo," Analog Stereo, Jun. 24, 2000 http://www.reviewsonline.com/articles/961906864.htm retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Non-Final Office Action dated Jun. 17, 2016, issued in connection with U.S. Appl. No. 15/056,585, filed Feb. 29, 2016, 15 pages.
Non-Final Office Action dated Apr. 25, 2017, issued in connection with U.S. Appl. No. 15/357,605, filed Nov. 21, 2016, 8 pages.
Non-Final Office Action dated Mar. 9, 2018, issued in connection with U.S. Appl. No. 15/713,620, filed Sep. 23, 2017, 9 pages.
Notice of Allowance dated Jul. 3, 2018, issued in connection with U.S. Appl. No. 15/713,620, filed Sep. 23, 2017, 7 pages.
Notice of Allowance dated Nov. 9, 2016, issued in connection with U.S. Appl. No. 15/056,585, filed Feb. 29, 2016, 7 pages.
Notice of Allowance dated Apr. 1, 2020, issued in connection with U.S. Appl. No. 16/143,336, filed Sep. 26, 2018, 9 pages.
Notice of Allowance dated Jan. 20, 2016, issued in connection with U.S. Appl. No. 13/693,243, filed Dec. 4, 2012, 9 pages.
Notice of Allowance dated Jan. 3, 2022, issued in connection with U.S. Appl. No. 16/995,422, filed Aug. 17, 2020, 10 pages.
Notice of Allowance dated Aug. 7, 2017, issued in connection with U.S. Appl. No. 15/357,605, filed Nov. 21, 2016, 7 pages.
Palm, Inc., "Handbook for the Palm VII Handheld," May 2000, 311 pages.
Presentations at WinHEC 2000, May 2000, 138 pages.
United States Patent and Trademark Office, U.S. Appl. No. 60/490,768, filed Jul. 28, 2003, entitled "Method for synchronizing audio playback between multiple networked devices," 13 pages.
United States Patent and Trademark Office, U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
Van Buskirk, Eliot, "Music Needs 'Connective Tissue' and Facebook Wants to Build It," E http://evolver.fm/2011/09/01/music-needs-connective-tissue-and-facebook-wants-to-build-it, 2011, 6 pages.
"Welcome. You're watching Apple TV." Apple TV 1st Generation Setup Guide, Apr. 8, 2008 http://manuals.info.apple.com/MANUALS/0/MA403/en_US/AppleTV_SetupGuide.pdf Retrieved Oct. 14, 2014, 40 pages.
"Welcome. You're watching Apple TV." Apple TV 2nd Generation Setup Guide, Mar. 10, 2011 Retrieved Oct. 16, 2014, 36 pages.
"Welcome. You're watching Apple TV." Apple TV 3rd Generation Setup Guide, Mar. 16, 2012 Retrieved Oct. 16, 2014, 36 pages.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.

\* cited by examiner

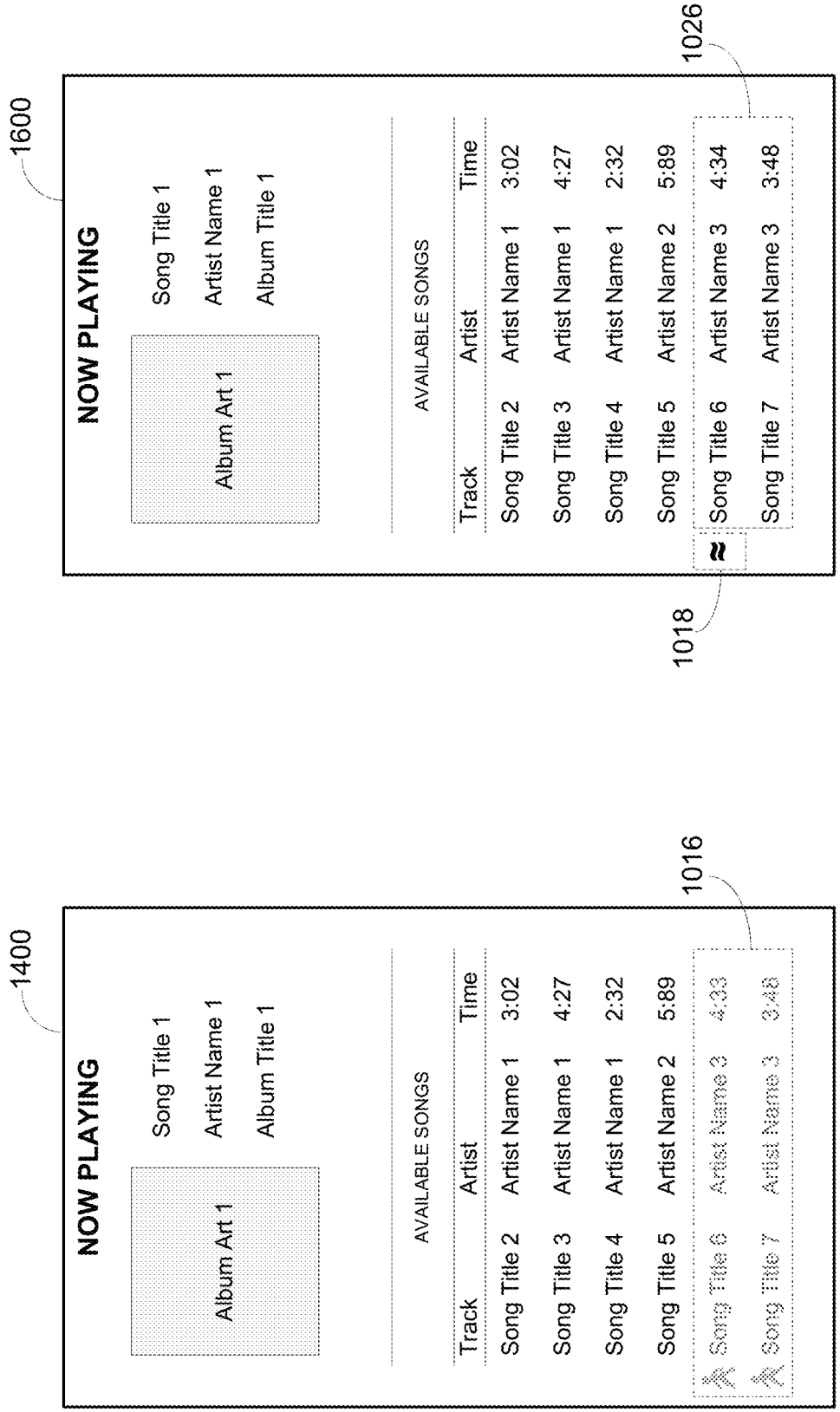

PLAYBACK DEVICE MEDIA ITEM REPLACEMENT

CROSS REFERENCE TO RELATED APPLICATIONS

This application claims priority under 35 U.S.C. § 120 to, and is a continuation of, U.S. non provisional patent application Ser. No. 16/995,422, filed on Aug. 17, 2020 entitled "Playback Device Media Item Replacement," which is incorporated herein by reference in its entirety.

U.S. non provisional patent application Ser. No. 16/995, 422 claims priority under 35 U.S.C. § 120 to, and is a continuation of, U.S. non-provisional patent application Ser. No. 16/143,336, filed on Sep. 26, 2018 entitled "Mobile Source Media Content Access," which issued as U.S. Pat. No. 10,749,613 on Aug. 18, 2020, and which is incorporated herein by reference in its entirety.

U.S. non-provisional patent application Ser. No. 16/143, 336 claims priority under 35 U.S.C. § 120 to, and is a continuation of, U.S. non-provisional patent application Ser. No. 15/713,620, filed on Sep. 23, 2017 entitled "Playback Device Media Item Replacement," which issued as U.S. Pat. No. 10,097,601 on Oct. 9, 2018, and which is incorporated herein by reference in its entirety.

U.S. non-provisional patent application Ser. No. 15/713, 620 claims priority under 35 U.S.C. § 120 to, and is a continuation of, U.S. non-provisional patent application Ser. No. 15/357,605, filed on Nov. 21, 2016, entitled "Mobile Source Media Content Access," which issued as U.S. Pat. No. 9,774,643 on Sep. 26, 2017, and which is also incorporated herein by reference in its entirety.

U.S. non-provisional patent application Ser. No. 15/357, 605 claims priority under 35 U.S.C. § 120 to, and is a continuation of, U.S. non-provisional patent application Ser. No. 15/056,585, filed on Feb. 29, 2016, entitled "Replacing Media Item," which issued as U.S. Pat. No. 9,537,915 on Jan. 3, 2017, and which is also incorporated herein by reference in its entirety.

U.S. non-provisional patent application Ser. No. 15/056, 585 claims priority under 35 U.S.C. § 120 to, and is a continuation of, U.S. non-provisional patent application Ser. No. 13/693,243, filed on Dec. 4, 2012, entitled "Media Source Media Content Access," which issued as U.S. Pat. No. 9,319,153 on Apr. 19, 2016, and which is also incorporated herein by reference in its entirety.

FIELD OF THE DISCLOSURE

The disclosure is related to consumer goods and, more particularly, to systems, products, features, services, and other items directed to media playback or some aspect thereof.

BACKGROUND

Technological advancements have increased the accessibility of music content, as well as other types of media, such as television content, movies, and interactive content. For example, a user can access audio, video, or both audio and video content over the Internet through an online store, an Internet radio station, a music service, a movie service, and so on, in addition to the more traditional avenues of accessing audio and video content. Demand for audio, video, and both audio and video content inside and outside of the home continues to increase.

BRIEF DESCRIPTION OF THE DRAWINGS

Features, aspects, and advantages of the presently disclosed technology may be better understood with regard to the following description, appended claims, and accompanying drawings where:

FIG. 10C shows an example third interface of a device in a media system; and

FIG. 10D shows an example fourth interface of a device in a media system.

Figure 1:
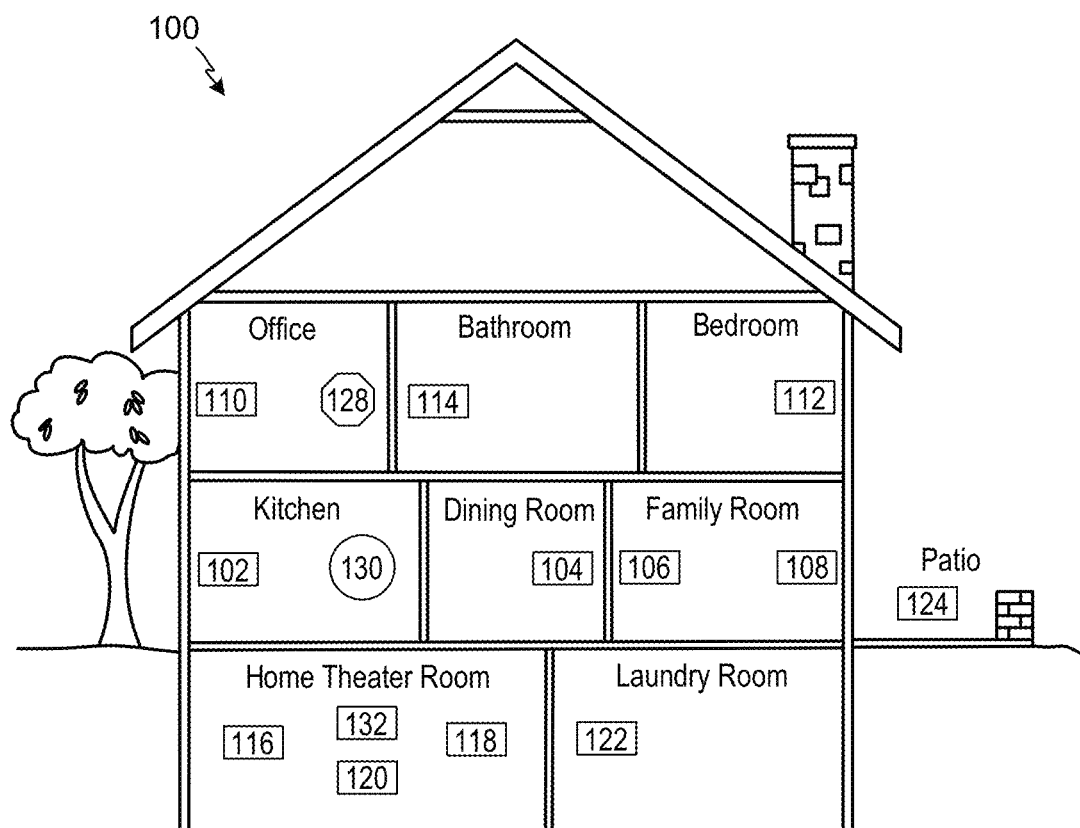
FIG. 1 shows an example configuration in which certain embodiments may be practiced.

In addition, the drawings are for the purpose of illustrating example embodiments, but it is understood that the inventions are not limited to the arrangements and instrumentality shown in the drawings.

DETAILED DESCRIPTION

I. Overview

Embodiments are described herein that may allow a user of a networked media system to add media from a personal device of the user to a media queue accessible by the media system and component devices of the media system. In particular, certain embodiments allow the user to selectively add media from the personal device to the queue, such that only a selected subset of media on the personal device, rather than all media on the personal device is added to the queue (unless the user decides, for example, to add all of the media from the personal device to the queue). In an embodiment, other controller(s) may view and play only the added media from the personal device via the networked media system. Further, the embodiments may provide to the queue equivalent media to the selected subset of media on the personal device in case the personal device is communicatively disconnected from the media system.

In one embodiment, the personal device may be a mobile media player such as an APPLE IPOD®, or a smart phone such as an APPLE IPHONE® or any ANDROID™ powered phone that may be configured to be in communication with the media system. In one example, the user may add media from the personal device to the queue by docking the personal device in a docking station of the media system. In such a case, the personal device may effectively become a component device of the media system, and all media stored on or available through the personal device may become accessible by the media system and other component devices of the media system.

In another case, the user may add media from the personal device to the queue using an application on the personal device in communication with the media system. In one example, a controller application for controlling the media system from the personal device may also be configured for use by the user may to select and add to the queue a selected subset of media stored on the personal device and/or accessible through the personal device. In this case, the media system may only have access to the selected subset of media from the personal device, and may not have access to the remaining, non-selected media from the personal device. In a further case, the personal device may be configured to add only the selected subset of media from the personal device to the queue, even if the personal device is docked to the media system. Such cases may be implemented to protect the privacy of a user by allowing the user to specifically control what content is shared on a media system if and when the user wishes to share content.

In an embodiment, the media from the personal device only includes media stored on the personal device. In another embodiment, the media includes any content accessible over a network via the personal device, such as media placed in cloud storage. In yet another embodiment, the media includes content accessible over a network via the personal device and/or media stored on the personal device.

In the case the personal device is not physically connected to the media system, the personal device may be a transient device that may move in and out of communicative range with the media system. For instance, the personal device may be physically carried by the user, and may travel around with the user. If the personal device moves out of communicative range with the media system, the media system may no longer have access to the subset of media the user may have added from the personal device to the queue. For such a case, certain embodiments of the present application may search for media equivalent to the subset of media from the personal device, and may provide the equivalent media of the subset of media is no longer accessible by the media system.

As suggested previously, the media on the personal device may include media stored on the personal device, as well as media accessible through the personal device. In one example, the personal device may include a storage medium on which media content data may be stored and from which the media content may be accessed. In another example, the personal device may be configured to have access to remote media repositories (e.g., media stored on a local network or a server in the cloud), and/or a media services such as RHAPSODY™, SPOTIFY™, and others. As such, the subset of media may include media from either, or both the local storage medium and remote media repositories.

Media or a pointer thereto (collectively referred to herein as "media" or "media content") may include a file, a uniform resource location (URL), or metadata used to identify the media content. For instance, a media repository may include one or more URLs that each identifies media, such as a song or video. The URLs may be specific for the media and the service. In another instance, a repository may include one or more media files, or a combination of files and URLs.

In one embodiment, adding the subset of media to the media system may involve transferring a copy of each media in the subset of media to a local storage medium of the media system. In another embodiment, adding the subset of media to the media system may involve providing to the media system pointers to each media in the subset of media. In a further embodiment, adding the subset of media to the media system may involve transferring a copy of some media in the subset of media to the local storage medium of the media system and providing pointers to other media in the subset of media to the media system. In yet another embodiment, both copies of and pointers to each media in the subset of media may be provided to the media system.

As suggested above, the present application enables a user to selectively add media from a personal device, such as a mobile device to a queue accessible by other devices in a media system. In one aspect, a method is provided. The method involves providing first media availability data. The first media availability data indicates first media available for access by a first device. The method further involves receiving from a second device having access to a first subset of media and a second subset of media, data indicating an addition of the first subset of media to a queue accessible by the first device, and providing second media availability data indicating second media available for access by the first device. The second media comprises the first media and the first subset of media and does not comprise the second subset of media.

In another aspect, a system is provided. The system includes at least one processor, a non-transitory computer readable medium, and program instructions stored on the non-transitory computer readable medium. The program instructions are executable by the at least one processor to perform functions including providing first media availability data. The first media availability data indicates first media available for access by a first device. The functions further include receiving from a second device having access to a first subset of media and a second subset of media, data indicating an addition of the first subset of media to a queue accessible by the first device, and providing second media availability data indicating second media available for access by the first device. The second media comprises the first media and the first subset of media and does not comprise the second subset of media.

In yet another aspect, a non-transitory computer readable medium having instructions stored thereon is provided. The instructions are executable by a computing device to cause the computing device to perform functions including providing first media availability data. The first media availability data indicates first media available for access by a first device. The functions further include receiving from a second device having access to a first subset of media and a second subset of media, data indicating an addition of the first subset of media to a queue accessible by the first device, and providing second media availability data indicating second media available for access by the first device. The second media comprises the first media and the first subset of media and does not comprise the second subset of media. Other embodiments are provided and described herein.

II. Example Operating Environment

Referring now to the drawings, in which like numerals can refer to like parts throughout the figures, FIG. 1 shows an example media system configuration 100 in which one or more embodiments disclosed herein can be practiced or implemented.

By way of illustration, the media system configuration 100 represents a home with multiple zones, though the home could have been configured with only one zone. Each zone, for example, may represent a different room or space, such as an office, bathroom, bedroom, kitchen, dining room, family room, home theater room, utility or laundry room, and patio. A single zone might also include multiple rooms or spaces if so configured. One or more of zone players 102-124 are shown in each respective zone. A zone player 102-124, also referred to as a playback device, multimedia unit, speaker, player, and so on, provides audio, video, and/or audiovisual output. A controller 130 (e.g., shown in the kitchen for purposes of illustration) provides control to the media system configuration 100. Controller 130 may be fixed to a zone, or alternatively, mobile such that it can be moved about the zones. The media system configuration 100 may also include more than one controller 130. The media system configuration 100 illustrates an example whole house media system, though it is understood that the technology described herein is not limited to its particular place of application or to an expansive system like a whole house media system 100 of FIG. 1.

a. Example Zone Players

Figure 2A:
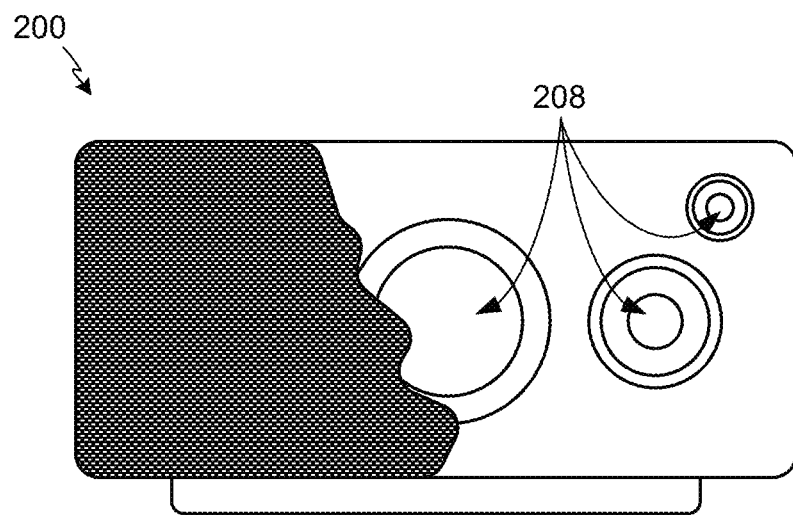
FIG. 2A shows an illustration of an example zone player having a built-in amplifier and transducers.
Figure 2B:
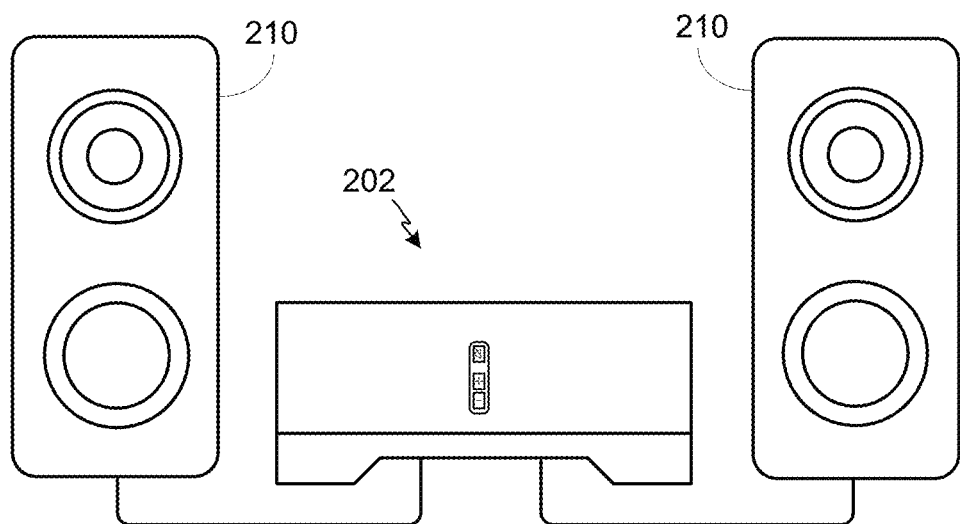
FIG. 2B shows an illustration of an example zone player having a built-in amplifier and connected to external speakers.
Figure 2C:
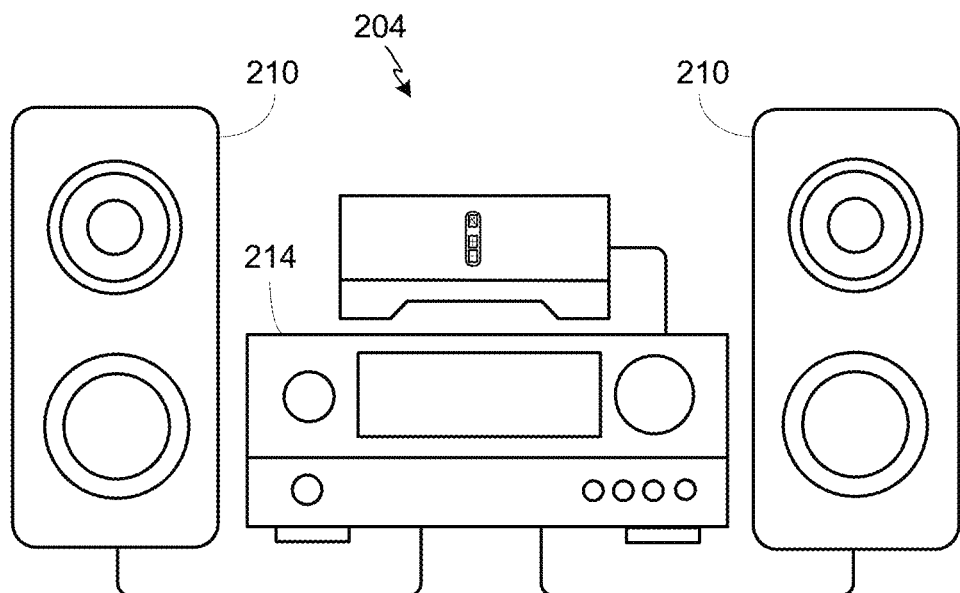
FIG. 2C shows an illustration of an example zone player connected to an A/V receiver and speakers.

FIGS. 2A, 2B, and 2C show example types of zone players. Zone players 200, 202, and 204 of FIGS. 2A, 2B, and 2C, respectively, can correspond to any of the zone players 102-124 of FIG. 1, for example. In some embodiments, audio is reproduced using only a single zone player, such as by a full-range player. In some embodiments, audio is reproduced using two or more zone players, such as by using a combination of full-range players or a combination of full-range and specialized players. In some embodiments, zone players 200-204 may also be referred to as a "smart speaker," because they contain processing capabilities beyond the reproduction of audio, more of which is described below.

FIG. 2A illustrates zone player 200 that includes sound producing equipment 208 capable of reproducing full-range sound. The sound may come from an audio signal that is received and processed by zone player 200 over a wired or wireless data network. Sound producing equipment 208 includes one or more built-in amplifiers and one or more acoustic transducers (e.g., speakers). A built-in amplifier is described more below with respect to FIG. 4. A speaker or acoustic transducer can include, for example, any of a tweeter, a mid-range driver, a low-range driver, and a subwoofer. In some embodiments, zone player 200 can be statically or dynamically configured to play stereophonic audio, monaural audio, or both. In some embodiments, zone player 200 is configured to reproduce a subset of full-range sound, such as when zone player 200 is grouped with other zone players to play stereophonic audio, monaural audio, and/or surround audio or when the audio content received by zone player 200 is less than full-range.

FIG. 2B illustrates zone player 202 that includes a built-in amplifier to power a set of detached speakers 210. A detached speaker can include, for example, any type of loudspeaker. Zone player 202 may be configured to power one, two, or more separate loudspeakers. Zone player 202 may be configured to communicate an audio signal (e.g.,
right and left channel audio or more channels depending on its configuration) to the detached speakers 210 via a wired path.

FIG. 2C illustrates zone player 204 that does not include a built-in amplifier, but is configured to communicate an audio signal, received over a data network, to an audio (or "audio/video") receiver 214 with built-in amplification.

Referring back to FIG. 1, in some embodiments, one, some, or all of the zone players 102 to 124 can retrieve audio directly from a source. For example, a zone player may contain a playlist or queue of audio items to be played (also referred to herein as a "playback queue"). Each item in the queue may comprise a uniform resource identifier (URI) or some other identifier. The URI or identifier can point the zone player to the audio source. The source might be found on the Internet (e.g., the cloud), locally from another device over data network 128 (described further below), from the controller 130, stored on the zone player itself, or from an audio source communicating directly to the zone player. In some embodiments, the zone player can reproduce the audio itself, send it to another zone player for reproduction, or both where the audio is played by the zone player and one or more additional zone players in synchrony. In some embodiments, the zone player can play a first audio content (or not play at all), while sending a second, different audio content to another zone player(s) for reproduction.

By way of illustration, SONOS, Inc. of Santa Barbara, Calif. presently offers for sale zone players referred to as a "PLAY:5," "PLAY:3," "CONNECT:AMP," "CONNECT," and "SUB." Any other past, present, and/or future zone players can additionally or alternatively be used to implement the zone players of example embodiments disclosed herein. Additionally, it is understood that a zone player is not limited to the particular examples illustrated in FIGS. 2A, 2B, and 2C or to the SONOS product offerings. For example, a zone player may include a wired or wireless headphone. In yet another example, a zone player might include a sound bar for television. In yet another example, a zone player can include or interact with a docking station for an Apple IPOD™ or similar device.

b. Example Controllers

Figure 3:
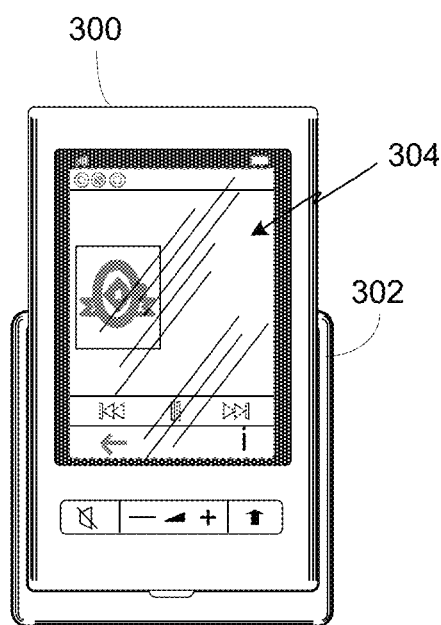
FIG. 3 shows an illustration of an example controller.

FIG. 3 illustrates an example wireless controller 300 in docking station 302. By way of illustration, controller 300 may correspond to controlling device 130 of FIG. 1. Docking station 302, if provided, may be used to charge a battery of controller 300. In some embodiments, controller 300 may be provided with a touch screen 304 that allows a user to interact through touch with the controller 300, for example, to retrieve and navigate a playlist of audio items, control operations of one or more zone players, and provide overall control of the system configuration 100. In certain embodiments, any number of controllers can be used to control the system configuration 100. In some embodiments, there may be a limit set on the number of controllers that can control the system configuration 100. The controllers might be wireless like wireless controller 300 or wired to data network 128.

In some embodiments, if more than one controller is used in system 100, each controller may be coordinated to display common content, and may all be dynamically updated to indicate changes made from a single controller. Coordination can occur, for instance, by a controller periodically requesting a state variable directly or indirectly from one or more zone players; the state variable may provide information about system 100, such as current zone group configuration, what is playing in one or more zones, volume levels, and other items of interest. The state variable may be passed around on data network 128 between zone players (and controllers, if so desired) as needed or as often as programmed.

In addition, an application running on any network-enabled portable device, such as an IPHONE™, IPAD™, ANDROID™ powered phone, or any other smart phone or network-enabled device can be used as controller 130. An application running on a laptop or desktop personal computer (PC) or Mac™ can also be used as controller 130. Such controllers may connect to system 100 through an interface with data network 128, a zone player, a wireless router, or using some other configured connection path. Example controllers offered by Sonos, Inc. of Santa Barbara, Calif. include a "Controller 200," "SONOS® CONTROL," "SONOS® Controller for IPHONE™," "SONOS® Controller for IPAD™," "SONOS® Controller for ANDROID™," "SONOS® Controller for MAC™ or PC."

c. Example Data Connection

Zone players 102 to 124 of FIG. 1 are coupled directly or indirectly to a data network, such as data network 128. Controller 130 may also be coupled directly or indirectly to data network 128 or individual zone players. Data network 128 is represented by an octagon in the figure to stand out from other representative components. While data network 128 is shown in a single location, it is understood that such a network is distributed in and around system 100. Particularly, data network 128 can be a wired network, a wireless network, or a combination of both wired and wireless networks. In some embodiments, one or more of the zone players 102-124 are wirelessly coupled to data network 128 based on a proprietary mesh network. In some embodiments, one or more of the zone players 102-124 are wirelessly coupled to data network 128 using a non-mesh topology. In some embodiments, one or more of the zone players 102-124 are coupled via a wire to data network 128 using Ethernet or similar technology. In addition to the one or more zone players 102-124 connecting to data network 128, data network 128 can further allow access to a wide area network, such as the Internet.

In some embodiments, connecting any of the zone players 102-124, or some other connecting device, to a broadband router, can create data network 128. Other zone players 102-124 can then be added wired or wirelessly to the data network 128. For example, a zone player (e.g., any of zone players 102-124) can be added to the system configuration 100 by simply pressing a button on the zone player itself (or perform some other action), which enables a connection to be made to data network 128. The broadband router can be connected to an Internet Service Provider (ISP), for example. The broadband router can be used to form another data network within the system configuration 100, which can be used in other applications (e.g., web surfing). Data network 128 can also be used in other applications, if so programmed. An example, second network may implement SONOSNET™ protocol, developed by SONOS, Inc. of Santa Barbara. SONOSNET™ represents a secure, AES-encrypted, peer-to-peer wireless mesh network. Alternatively, in certain embodiments, the data network 128 is the same network, such as a traditional wired or wireless network, used for other applications in the household.

d. Example Zone Configurations

A particular zone can contain one or more zone players. For example, the family room of FIG. 1 contains two zone players 106 and 108, while the kitchen is shown with one zone player 102. In another example, the home theater room contains additional zone players to play audio from a 5.1 channel or greater audio source (e.g., a movie encoded with 5.1 or greater audio channels). In some embodiments, one can position a zone player in a room or space and assign the zone player to a new or existing zone via controller 130. As such, zones may be created, combined with another zone, removed, and given a specific name (e.g., "Kitchen"), if so desired and programmed to do so with controller 130. Moreover, in some embodiments, zone configurations may be dynamically changed even after being configured using controller 130 or some other mechanism.

In some embodiments, if a zone contains two or more zone players, such as the two zone players 106 and 108 in the family room, then the two zone players 106 and 108 can be configured to play the same audio source in synchrony, or the two zone players 106 and 108 can be paired to play two separate sounds in left and right channels, for example. In other words, the stereo effects of a sound can be reproduced or enhanced through the two zone players 106 and 108, one for the left sound and the other for the right sound. In certain embodiments, paired zone players (also referred to as "bonded zone players") can play audio in synchrony with other zone players in the same or different zones.

In some embodiments, two or more zone players can be sonically consolidated to form a single, consolidated zone player. A consolidated zone player (though made up of multiple, separate devices) can be configured to process and reproduce sound differently than an unconsolidated zone player or zone players that are paired, because a consolidated zone player will have additional speaker drivers from which sound can be passed. The consolidated zone player can further be paired with a single zone player or yet another consolidated zone player. Each playback device of a consolidated playback device can be set in a consolidated mode, for example.

According to some embodiments, one can continue to do any of: group, consolidate, and pair zone players, for example, until a desired configuration is complete. The actions of grouping, consolidation, and pairing are preferably performed through a control interface, such as using controller 130, and not by physically connecting and re-connecting speaker wire, for example, to individual, discrete speakers to create different configurations. As such, certain embodiments described herein provide a more flexible and dynamic platform through which sound reproduction can be offered to the end-user.

e. Example Audio Sources

In some embodiments, each zone can play from the same audio source as another zone or each zone can play from a different audio source. For example, someone can be grilling on the patio and listening to jazz music via zone player 124, while someone is preparing food in the kitchen and listening to classical music via zone player 102. Further, someone can be in the office listening to the same jazz music via zone player 110 that is playing on the patio via zone player 124. In some embodiments, the jazz music played via zone players 110 and 124 is played in synchrony. Synchronizing playback amongst zones allows for someone to pass through zones while seamlessly (or substantially seamlessly) listening to the audio. Further, zones can be put into a "party mode" such that all associated zones will play audio in synchrony.

Sources of audio content to be played by zone players 102-124 are numerous. In some embodiments, music on a zone player itself may be accessed and a played. In some embodiments, music from a personal library stored on a computer or networked-attached storage (NAS) may be accessed via the data network 128 and played. In some embodiments, Internet radio stations, shows, and podcasts can be accessed via the data network 128. Music or cloud services that let a user stream and/or download music and audio content can be accessed via the data network 128. Further, music can be obtained from traditional sources, such as a turntable or CD player, via a line-in connection to a zone player, for example. Audio content can also be accessed using a different protocol, such as AIRPLAY™, which is a wireless technology by Apple, Inc., for example. Audio content received from one or more sources can be shared amongst the zone players 102 to 124 via data network 128 and/or controller 130. The above-disclosed sources of audio content are referred to herein as network-based audio information sources. However, network-based audio information sources are not limited thereto.

In some embodiments, the example home theater zone players 116, 118, 120 are coupled to an audio information source such as a television 132. In some examples, the television 132 is used as a source of audio for the home theater zone players 116, 118, 120, while in other examples audio information from the television 132 can be shared with any of the zone players 102-124 in the audio system 100.

III. Example Zone Players

Figure 4:
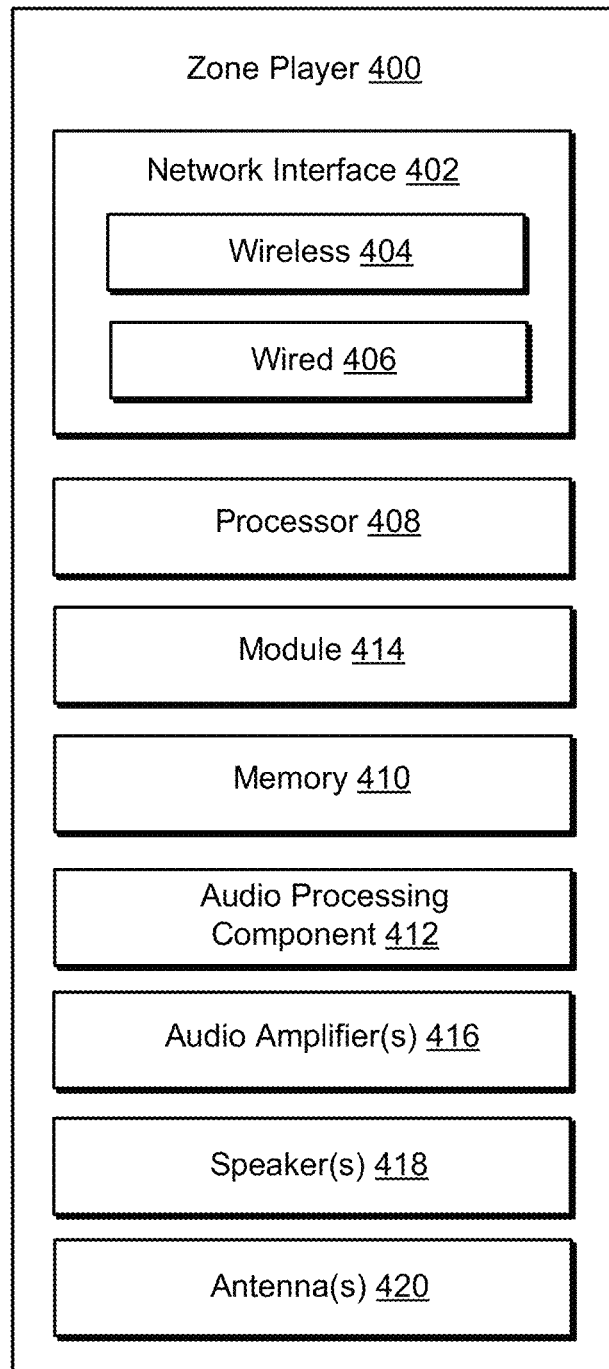
FIG. 4 shows an internal functional block diagram of an example zone player.

Referring now to FIG. 4, there is shown an example block diagram of a zone player 400 in accordance with an embodiment. Zone player 400 includes a network interface 402, a processor 408, a memory 410, an audio processing component 412, one or more modules 414, an audio amplifier 416, and a speaker unit 418 coupled to the audio amplifier 416. FIG. 2A shows an example illustration of such a zone player. Other types of zone players may not include the speaker unit 418 (e.g., such as shown in FIG. 2B) or the audio amplifier 416 (e.g., such as shown in FIG. 2C). Further, it is contemplated that the zone player 400 can be integrated into another component. For example, the zone player 400 could be constructed as part of a television, lighting, or some other device for indoor or outdoor use.

In some embodiments, network interface 402 facilitates a data flow between zone player 400 and other devices on a data network 128. In some embodiments, in addition to getting audio from another zone player or device on data network 128, zone player 400 may access audio directly from the audio source, such as over a wide area network or on the local network. In some embodiments, the network interface 402 can further handle the address part of each packet so that it gets to the right destination or intercepts packets destined for the zone player 400. Accordingly, in certain embodiments, each of the packets includes an Internet Protocol (IP)-based source address as well as an IP-based destination address.

In some embodiments, network interface 402 can include one or both of a wireless interface 404 and a wired interface 406. The wireless interface 404, also referred to as a radio frequency (RF) interface, provides network interface functions for the zone player 400 to wirelessly communicate with other devices (e.g., other zone player(s), speaker(s), receiver(s), component(s) associated with the data network 128, and so on) in accordance with a communication protocol (e.g., any wireless standard including IEEE 802.11a, 802.11b, 802.11g, 802.11n, or 802.15). Wireless interface 404 may include one or more radios. To receive wireless signals and to provide the wireless signals to the wireless interface 404 and to transmit wireless signals, the zone player 400 includes one or more antennas 420. The wired interface 406 provides network interface functions for the zone player 400 to communicate over a wire with other devices in accordance with a communication protocol (e.g., IEEE 802.3). In some embodiments, a zone player includes multiple wireless 404 interfaces. In some embodiments, a zone player includes multiple wired 406 interfaces. In some embodiments, a zone player includes both of the interfaces 404 and 406. In some embodiments, a zone player 400 includes only the wireless interface 404 or the wired interface 406.

In some embodiments, the processor 408 is a clock-driven electronic device that is configured to process input data according to instructions stored in memory 410. The memory 410 is data storage that can be loaded with one or more software module(s) 414, which can be executed by the processor 408 to achieve certain tasks. In the illustrated embodiment, the memory 410 is a tangible machine-readable medium storing instructions that can be executed by the processor 408. In some embodiments, a task might be for the zone player 400 to retrieve audio data from another zone player or a device on a network (e.g., using a uniform resource locator (URL) or some other identifier). In some embodiments, a task may be for the zone player 400 to send audio data to another zone player or device on a network. In some embodiments, a task may be for the zone player 400 to synchronize playback of audio with one or more additional zone players. In some embodiments, a task may be to pair the zone player 400 with one or more zone players to create a multi-channel audio environment. Additional or alternative tasks can be achieved via the one or more software module(s) 414 and the processor 408.

The audio processing component 412 can include one or more digital-to-analog converters (DAC), an audio preprocessing component, an audio enhancement component or a digital signal processor, and so on. In some embodiments, the audio processing component 412 may be part of processor 408. In some embodiments, the audio that is retrieved via the network interface 402 is processed and/or intentionally altered by the audio processing component 412. Further, the audio processing component 412 can produce analog audio signals. The processed analog audio signals are then provided to the audio amplifier 416 for play back through speakers 418. In addition, the audio processing component 412 can include circuitry to process analog or digital signals as inputs to play from zone player 400, send to another zone player on a network, or both play and send to another zone player on the network. An example input includes a line-in connection (e.g., an auto-detecting 3.5 mm audio line-in connection).

The audio amplifier 416 is a device(s) that amplifies audio signals to a level for driving one or more speakers 418. The one or more speakers 418 can include an individual transducer (e.g., a "driver") or a complete speaker system that includes an enclosure including one or more drivers. A particular driver can be a subwoofer (e.g., for low frequencies), a mid-range driver (e.g., for middle frequencies), and a tweeter (e.g., for high frequencies), for example. An enclosure can be sealed or ported, for example. Each transducer may be driven by its own individual amplifier.

A commercial example, presently known as the PLAY:5™, is a zone player with a built-in amplifier and speakers that is capable of retrieving audio directly from the source, such as on the Internet or on the local network, for example. In particular, the PLAY:5™ is a five-amp, five-driver speaker system that includes two tweeters, two mid-range drivers, and one woofer. When playing audio content via the PLAY:5, the left audio data of a track is sent out of the left tweeter and left mid-range driver, the right audio data of a track is sent out of the right tweeter and the right mid-range driver, and mono bass is sent out of the subwoofer. Further, both mid-range drivers and both tweeters have the same equalization (or substantially the same equalization). That is, they are both sent the same frequencies but from different channels of audio. Audio from Internet radio stations, online music and video services, downloaded music, analog audio inputs, television, DVD, and so on, can be played from the PLAY:5™.

IV. Example Controller

Figure 5:
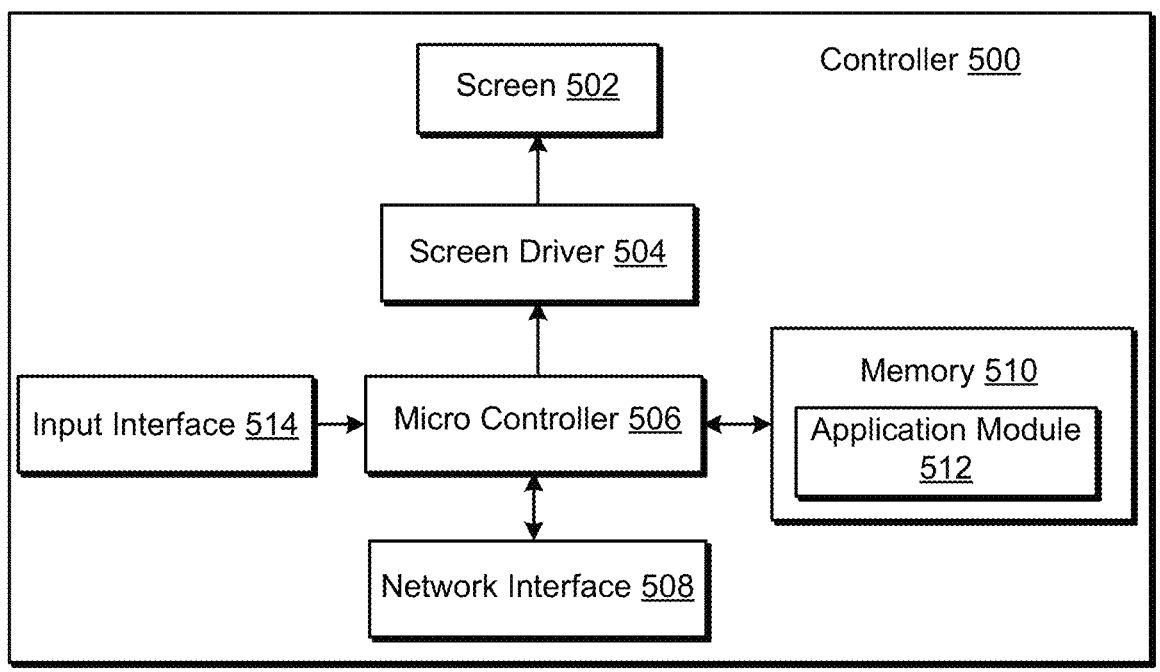
FIG. 5 shows an internal functional block diagram of an example controller.

Referring now to FIG. 5, there is shown an example block diagram for controller 500, which can correspond to the controlling device 130 in FIG. 1. Controller 500 can be used to facilitate the control of multi-media applications, automation and others in a system. In particular, the controller 500 may be configured to facilitate a selection of a plurality of audio sources available on the network and enable control of one or more zone players (e.g., the zone players 102-124 in FIG. 1) through a wireless or wired network interface 508. According to one embodiment, the wireless communications is based on an industry standard (e.g., infrared, radio, wireless standards including IEEE 802.11a, 802.11b, 802.11g, 802.11n, 802.15, and so on). Further, when a particular audio is being accessed via the controller 500 or being played via a zone player, a picture (e.g., album art) or any other data, associated with the audio and/or audio source can be transmitted from a zone player or other electronic device to controller 500 for display.

Controller 500 is provided with a screen 502 and an input interface 514 that allows a user to interact with the controller 500, for example, to navigate a playlist of many multimedia items and to control operations of one or more zone players. The screen 502 on the controller 500 can be an LCD screen, for example. The screen 500 communicates with and is commanded by a screen driver 504 that is controlled by a microcontroller (e.g., a processor) 506. The memory 510 can be loaded with one or more application modules 512 that can be executed by the microcontroller 506 with or without a user input via the user interface 514 to achieve certain tasks. In some embodiments, an application module 512 is configured to facilitate grouping a number of selected zone players into a zone group and synchronizing the zone players for audio play back. In some embodiments, an application module 512 is configured to control the audio sounds (e.g., volume) of the zone players in a zone group. In operation, when the microcontroller 506 executes one or more of the application modules 512, the screen driver 504 generates control signals to drive the screen 502 to display an application specific user interface accordingly.

The controller 500 includes a network interface 508 that facilitates wired or wireless communication with a zone player. In some embodiments, the commands such as volume control and audio playback synchronization are sent via the network interface 508. In some embodiments, a saved zone group configuration is transmitted between a zone player and a controller via the network interface 508. The controller 500 can control one or more zone players, such as 102-124 of FIG. 1. There can be more than one controller for a particular system, and each controller may share common information with another controller, or retrieve the common information from a zone player, if such a zone player stores configuration data (e.g., such as a state variable). Further, a controller can be integrated into a zone player.

It should be noted that other network-enabled devices such as an IPHONE™, IPAD™ or any other smart phone or network-enabled device (e.g., a networked computer such as a PC or MAC™) can also be used as a controller to interact or control zone players in a particular environment. In some embodiments, a software application or upgrade can be downloaded onto a network-enabled device to perform the functions described herein.

In certain embodiments, a user can create a zone group (also referred to as a bonded zone) including at least two zone players from the controller 500. The zone players in the zone group can play audio in a synchronized fashion, such that all of the zone players in the zone group play back an identical audio source or a list of identical audio sources in a synchronized manner such that no (or substantially no) audible delays or hiccups are to be heard. Similarly, in some embodiments, when a user increases the audio volume of the group from the controller 500, the signals or data of increasing the audio volume for the group are sent to one of the zone players and causes other zone players in the group to be increased together in volume.

A user via the controller 500 can group zone players into a zone group by activating a "Link Zones" or "Add Zone" soft button, or de-grouping a zone group by activating an "Unlink Zones" or "Drop Zone" button. For example, one mechanism for 'joining' zone players together for audio play back is to link a number of zone players together to form a group. To link a number of zone players together, a user can manually link each zone player or room one after the other. For example, assume that there is a multi-zone system that includes the following zones: Bathroom, Bedroom, Den, Dining Room, Family Room, and Foyer.

In certain embodiments, a user can link any number of the six zone players, for example, by starting with a single zone and then manually linking each zone to that zone.

In certain embodiments, a set of zones can be dynamically linked together using a command to create a zone scene or theme (subsequent to first creating the zone scene). For instance, a "Morning" zone scene command can link the Bedroom, Office, and Kitchen zones together in one action. Without this single command, the user would manually and individually link each zone. The single command may include a mouse click, a double mouse click, a button press, a gesture, or some other programmed action. Other kinds of zone scenes can be programmed.

In certain embodiments, a zone scene can be triggered based on time (e.g., an alarm clock function). For instance, a zone scene can be set to apply at 8:00 am. The system can link appropriate zones automatically, set specific music to play, and then stop the music after a defined duration. Although any particular zone can be triggered to an "On" or "Off" state based on time, for example, a zone scene enables any zone(s) linked to the scene to play a predefined audio (e.g., a favorable song, a predefined playlist) at a specific time and/or for a specific duration. If, for any reason, the scheduled music failed to be played (e.g., an empty playlist, no connection to a share, failed Universal Plug and Play (UPnP), no Internet connection for an Internet Radio station, and so on), a backup buzzer can be programmed to sound. The buzzer can include a sound file that is stored in a zone player, for example.

V. Example Ad-Hoc Network

Figure 6:
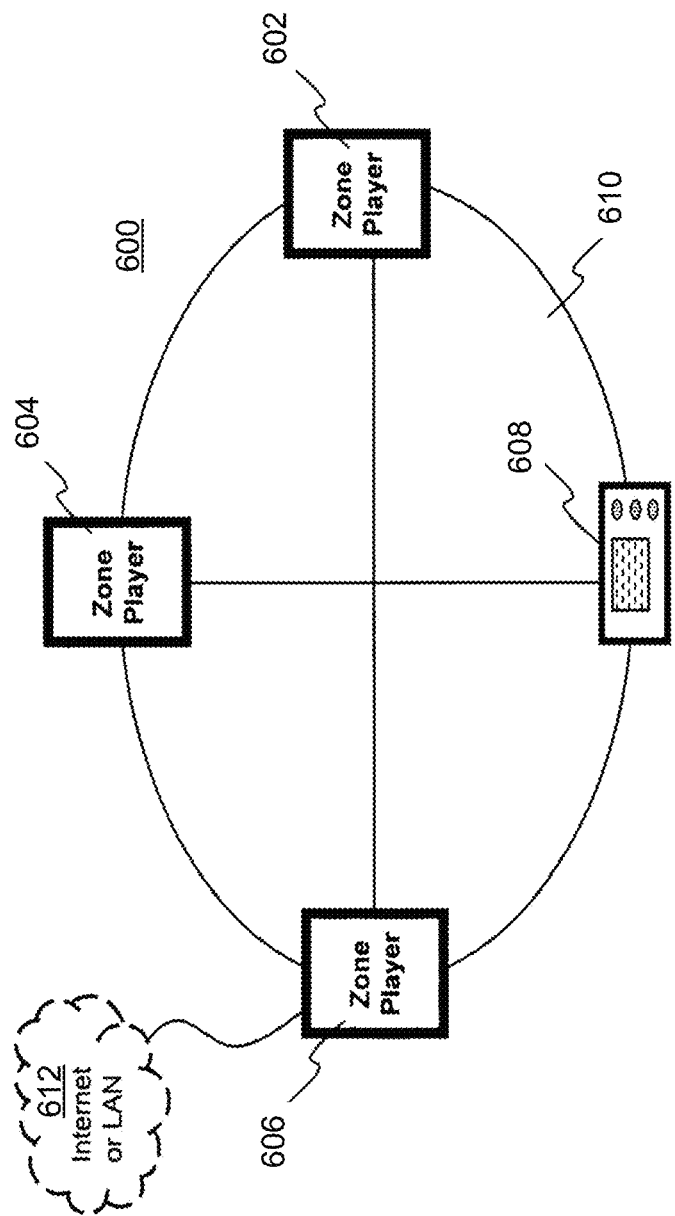
FIG. 6 shows an example ad-hoc playback network.

Certain particular examples are now provided in connection with FIG. 6 to describe, for purposes of illustration, certain systems and methods to provide and facilitate connection to a playback network. FIG. 6 shows that there are three zone players 602, 604 and 606 and a controller 608 that form a network branch that is also referred to as an Ad-Hoc network 610. The network 610 may be wireless, wired, or a combination of wired and wireless. In general, an Ad-Hoc (or "spontaneous") network is a local area network or other small network in which there is generally no one access point for all traffic. With an established Ad-Hoc network 610, the devices 602, 604, 606 and 608 can all communicate with each other in a "peer-to-peer" style of communication, for example. Furthermore, devices may join and/or leave from the network 610, and the network 610 will automatically reconfigure itself without needing the user to reconfigure the network 610. While an Ad-Hoc network is referenced in FIG. 6, it is understood that a playback network may be based on a type of network that is completely or partially different from an Ad-Hoc network.

Using the Ad-Hoc network 610, the devices 602, 604, 606, and 608 can share or exchange one or more audio sources and be dynamically grouped to play the same or different audio sources. For example, the devices 602 and 604 are grouped to playback one piece of music, and at the same time, the device 606 plays back another piece of music. In other words, the devices 602, 604, 606 and 608, as shown in FIG. 6, form a HOUSEHOLD that distributes audio and/or reproduces sound. As used herein, the term HOUSEHOLD (provided in uppercase letters to disambiguate from the user's domicile) is used to represent a collection of networked devices that are cooperating to provide an application or service. An instance of a HOUSEHOLD is identified with a household 610 (or household identifier), though a HOUSEHOLD may be identified with a different area or place.

In certain embodiments, a household identifier (HHID) is a short string or an identifier that is computer-generated to help ensure that it is unique. Accordingly, the network 610 can be characterized by a unique HHID and a unique set of configuration variables or parameters, such as channels (e.g., respective frequency bands), service set identifier (SSID) (a sequence of alphanumeric characters as a name of a wireless network), and WEP keys (wired equivalent privacy or other security keys). In certain embodiments, SSID is set to be the same as HHID.

In certain embodiments, each HOUSEHOLD includes two types of network nodes: a control point (CP) and a zone player (ZP). The control point controls an overall network setup process and sequencing, including an automatic generation of required network parameters (e.g., WEP keys). In an embodiment, the CP also provides the user with a HOUSEHOLD configuration user interface. The CP function can be provided by a computer running a CP application module, or by a handheld controller (e.g., the controller 308) also running a CP application module, for example. The zone player is any other device on the network that is placed to participate in the automatic configuration process. The ZP, as a notation used herein, includes the controller 308 or a computing device, for example. In some embodiments, the functionality, or certain parts of the functionality, in both the CP and the ZP are combined at a single node (e.g., a ZP contains a CP or vice-versa).

In certain embodiments, configuration of a HOUSEHOLD involves multiple CPs and ZPs that rendezvous and establish a known configuration such that they can use a standard networking protocol (e.g., IP over Wired or Wireless Ethernet) for communication. In an embodiment, two types of networks/protocols are employed: Ethernet 802.3 and Wireless 802.11g. Interconnections between a CP and a ZP can use either of the networks/protocols. A device in the system as a member of a HOUSEHOLD can connect to both networks simultaneously.

In an environment that has both networks in use, it is assumed that at least one device in a system is connected to both as a bridging device, thus providing bridging services between wired/wireless networks for others. The zone player 606 in FIG. 6 is shown to be connected to both networks, for example. The connectivity to the network 612 is based on Ethernet and/or Wireless, while the connectivity to other devices 602, 604 and 608 is based on Wireless and Ethernet if so desired.

It is understood, however, that in some embodiments each zone player 606, 604, 602 may access the Internet when retrieving media from the cloud (e.g., the Internet) via the bridging device. For example, zone player 602 may contain a uniform resource locator (URL) that specifies an address to a particular audio track in the cloud. Using the URL, the zone player 602 may retrieve the audio track from the cloud, and ultimately play the audio out of one or more zone players.

VI. Example System Configuration

Figure 7:
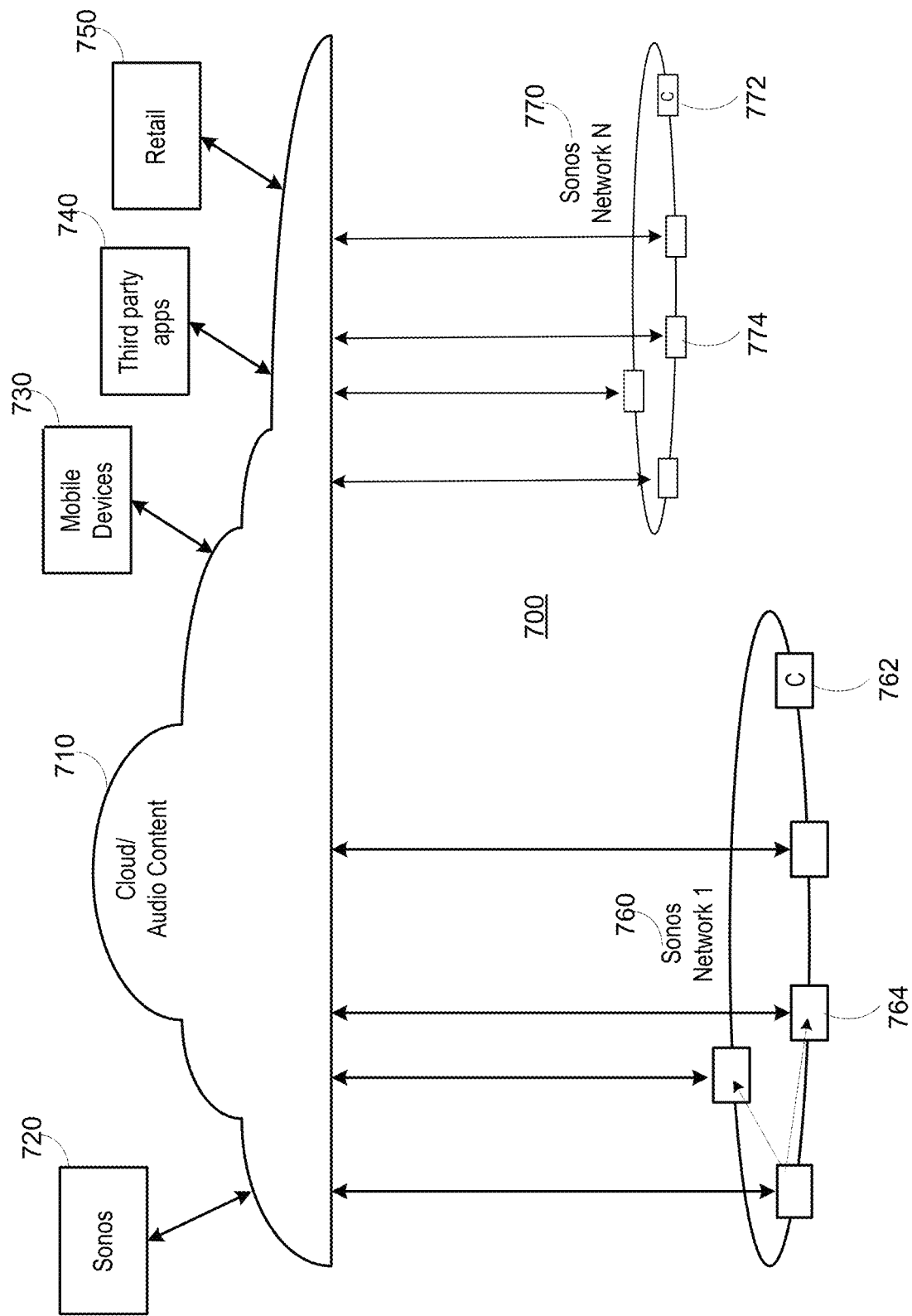
FIG. 7 shows a system of a plurality of networks including a cloud-based network and at least one local playback network.

FIG. 7 shows a system including a plurality of networks including a cloud-based network and at least one local playback network. A local playback network includes a plurality of playback devices or players, though it is understood that the playback network may contain only one playback device. In certain embodiments, each player has an ability to retrieve its content for playback. Control and content retrieval can be distributed or centralized, for example. Input can include streaming content provider input, third party application input, mobile device input, user input, and/or other playback network input into the cloud for local distribution and playback.

As illustrated by the example system 700 of FIG. 7, a plurality of content providers 720-750 can be connected to one or more local playback networks 760-770 via a cloud and/or other network 710. Using the cloud 710, a multimedia audio system 720 (e.g., Sonos™), a mobile device 730, a third party application 740, a content provider 750 and so on can provide multimedia content (requested or otherwise) to local playback networks 760, 770. Within each local playback network 760, 770, a controller 762, 772 and a playback device 764, 774 can be used to playback audio content.

VII. Example Mobile Source Media Content Access

As mentioned above, embodiments for allowing a user of a networked media system to add media from a personal device of the user to a media queue accessible by the media system and component devices of the media system are provided herein. In one example, a person ("user") using the media system 100 of FIG. 1A may be carrying a personal mobile device, such as a mobile media player such as an APPLE IPOD®, or a smart phone such as an APPLE IPHONE® or any ANDROID™ powered phone that may be configured to be in communication with the media system. The personal mobile device may have access to or stored thereon media the user wishes to add to a queue of the media system 100. For purposes of illustration, the user could be the owner/regular-user of the media system 100 or a guest with authority for his/her personal mobile device to communicate with the media system 100.

In one embodiment, the user may have the option to add only a selected subset of the media on the mobile device to the queue, while keeping the remaining media on the mobile private or inaccessible by the media system 100. In one case, adding the subset of media to the queue may involve providing for each media in the subset, a URL through which the media system 100 may access a respective media in the subset. In some embodiments, the URL points back to the media on the personal mobile device.

Once the subset of media has been added to the queue, another user of the media system 100, such as a friend of the user with the mobile device may be accessing the media system 100 via a controller device, such as the controller device 130 discussed above. In one embodiment, the friend may view and access the subset of media added to the queue by the user in addition to other media already available for access by the media system 100, but may not view or access the remaining media on the personal mobile device that were not added by the user. The friend may then proceed to cause the media system 100 to render media from the subset of media, or add media from the subset of media to a playlist to be rendered at a later time.

In one example, the user may leave a vicinity of the media system 100 or may shut off or disconnect from the network the personal mobile device. Whichever the circumstances, the personal mobile device may no longer be in communication with the media system 100. In this case, the URLs provided to the media system 100 when the subset of media was added to the queue may no longer be valid, and a media experience of the friend may be affected if the friend was enjoying or expecting to enjoy media from the subset of media when the personal mobile device was disconnected. In one embodiment, media equivalent to each of the subset of media may be searched for and retrieved to replace the subset of media in the queue in such a scenario. Implementation of such an embodiment may ensure that the friend's enjoyment of media rendered by the media system 100 is maintained or at least minimally affected when the personal mobile device is disconnected.

Figure 8:
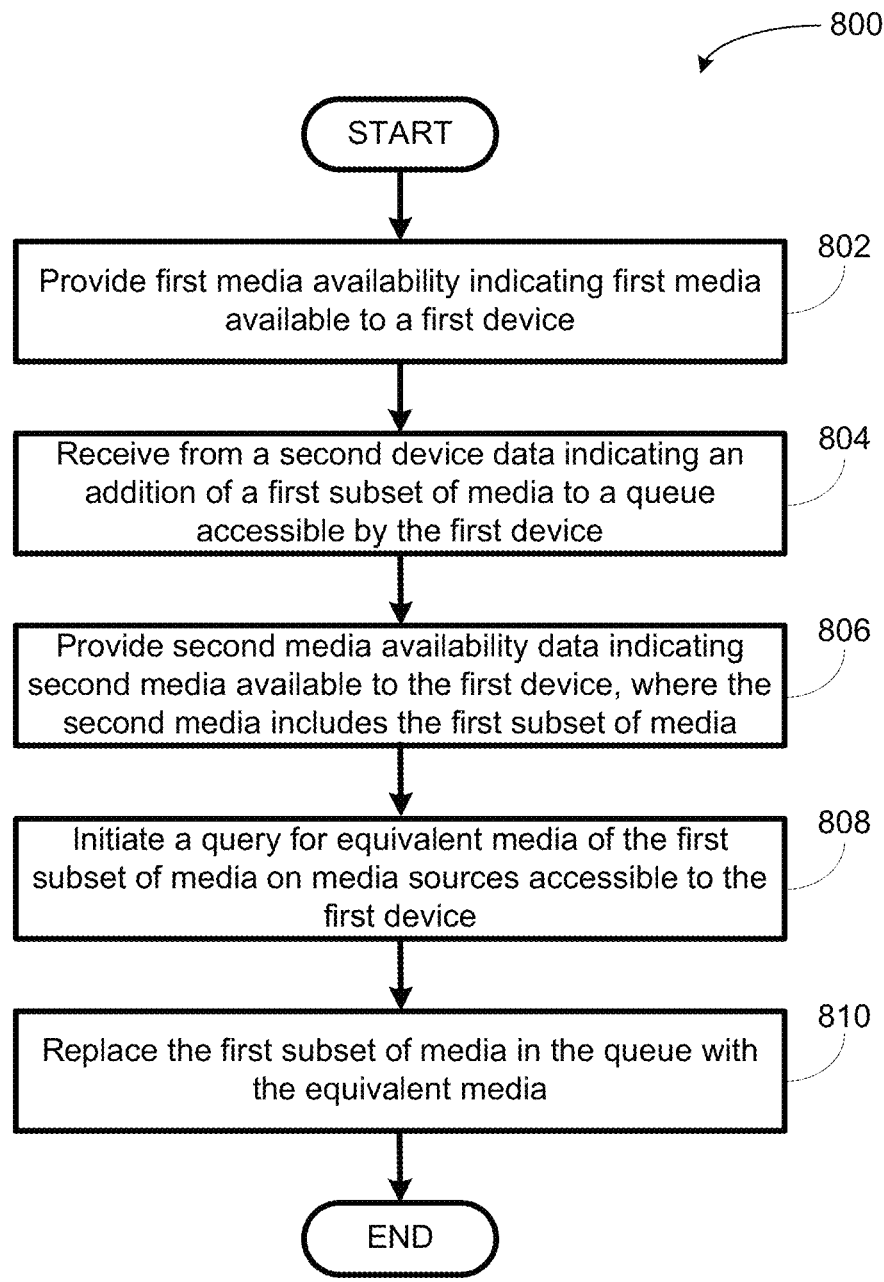
FIG. 8 shows an example flow diagram for selective addition of media for access by a device in a media system.

FIG. 8 shows an example flow diagram of a method 800 for selective addition of media for access by a device in a media system, in accordance with at least some embodiments described herein. Method 800 shown in FIG. 8 presents an embodiment of a method that could be used in the environment 100 with the systems 200, 202, 204, 300, 400, and 500 for example, in communication with one or more devices, such as devices illustrated in FIGS. 2-5. Method 800 may include one or more operations, functions, or actions as illustrated by one or more of blocks 802-810. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for the method 800 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the method 800 and other processes and methods disclosed herein, each block in FIG. 8 may represent circuitry that is wired to perform the specific logical functions in the process.

At block 802, the method 800 may involve providing first media availability data. In one example, the first media availability data may indicate first media available for access by a first device. The first device may be a component device of a media system. For instance, in connection with the previous discussions, the first device may be a zone player such as one of the zone players 102-124, or a controller such as the controller 130 of the media system 100 shown in FIG. 1. The first media may include all media available for access by the media system 100. In other words, the first media may include all media available for rendering by the media system 100.

Figure 9A:
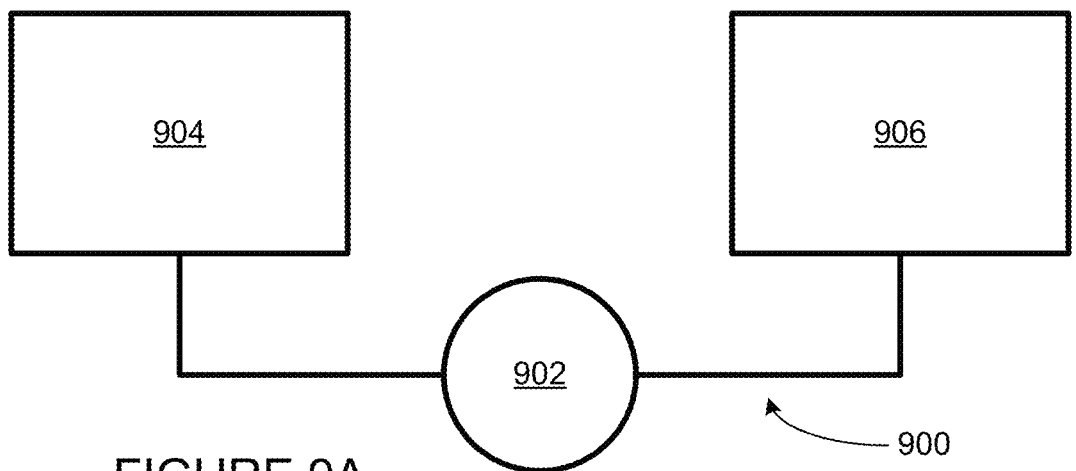
FIG. 9A shows an example block diagram representing a first media accessibility.

FIG. 9A shows an example block diagram representing first media accessibility 900, including an illustrative device 902 and illustrative media sources 904 and 906. In one example, the device 902 may represent the media system 100. In another example, the device 902 may represent a device associated with the media system 100. In either example, media sources 904 and 906 may represent media sources accessible by the media system 100. For instance, media source 904 may be a local storage medium, and media source 906 may be a media service accessible over a network. A shown, the device 902 may be connected to the media sources 904 and 906, indicating access to media on both media sources 904 and 906 by the device 902. In one case, the connection between the device 902 and the media sources 904 and 906 may be representative of URL pointers stored on the device 902 identifying the locations of the media sources 904 and 906 in reference to the device 902. Referring back to block 802, the device 902 may correspond to the first device, and the first media available for access by the first device may include media on the media sources 904 and 906.

Figures 10A, 10B:
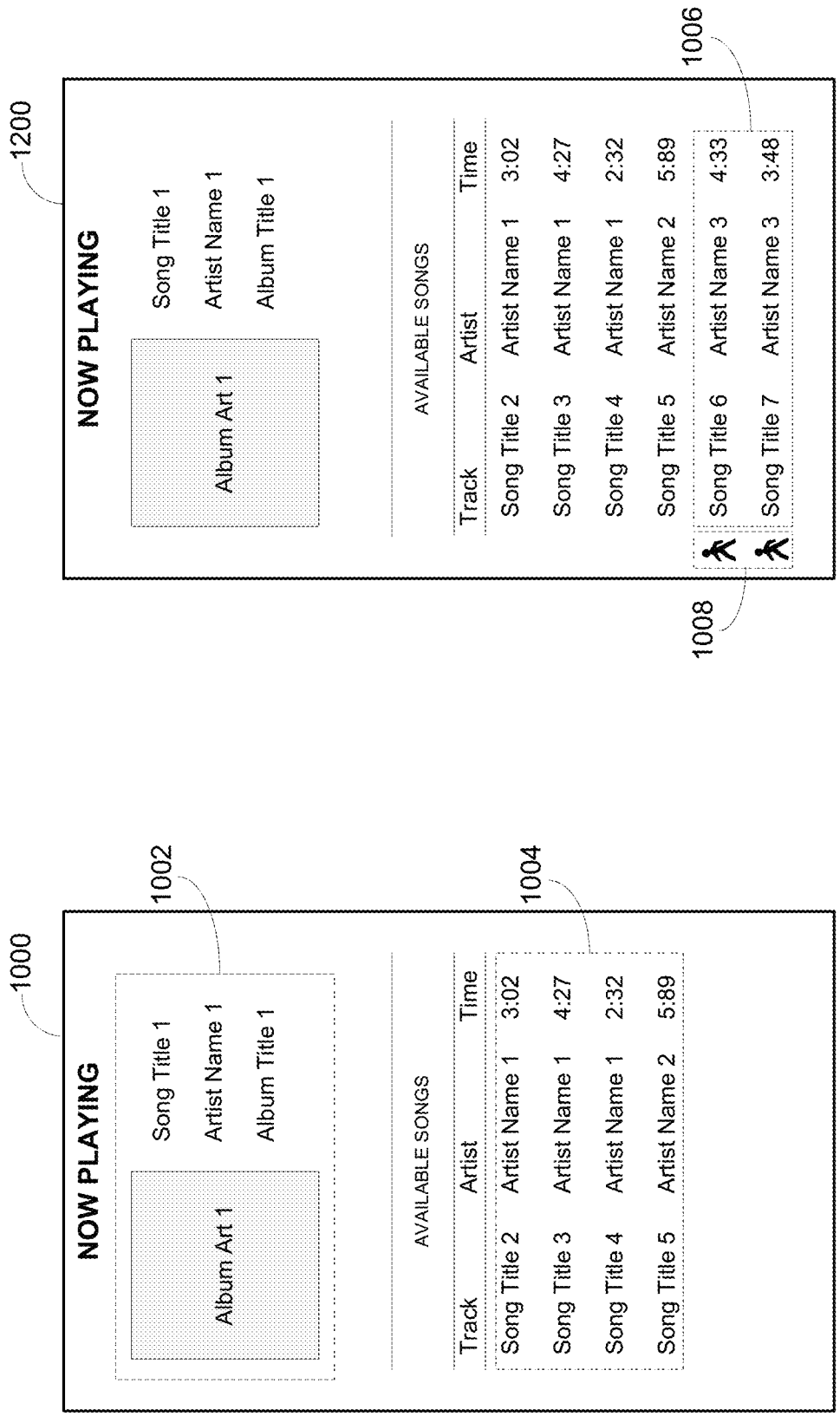
FIG. 10A shows an example first interface of a device in a media system.
FIG. 10B shows an example second interface of a device in a media system.

In some scenarios, a user of the first device and/or media system may wish to view the available media. FIG. 10A shows an example first interface 1000 of a device in a media system. In this case, the device may be the first device and/or the device 902, and the media system may be the media system 100 of FIG. 1 and/or the device 902 of FIG. 9A. As shown, the interface 1000 may provide now playing information 1002 under a "NOW PLAYING" section indicating media, or in this case, a song that is currently playing, if a song is currently playing. The interface 100 may also provide available media information 1004 under an "AVAILABLE SONGS" section indicating media that is available. In this example, the available media information 1004 may list all media on the media source 904 and 906.

At block 804, the method 800 may involve receiving from a second device having access to a first subset of media and a second subset of media, data indicating an addition of the first subset of media to a queue accessible by the first device. In this example, the queue may represent a list of media accessible by the media system 100 for rendering.

In one example, the second device may be a personal device from which a user may wish to add media to the media system. Rather than a component device such as the first device, the second device may be a mobile device such as a mobile phone or mobile media player carried by the user and in communication with the media system 100 via a cellular network (such as a 3G network) or a local Wi-Fi network. In one case, the second device may be registered with the media system 100 so as to communicate with the media system 100 to control the media system 100, access media through the media system 100, or in this case, add media to a queue of the media system 100. In one instance, the second device may detect the media system 100, or the media system 100 may detect the second device when the second device is within communication range of the media system 100. In this instance, the user of the second device may then be prompted to register or connect with the media system 100 via the second device.

As discussed previously, the user may wish to add only the first subset of media from the second device to the queue and may wish to keep the second subset of media private. Accordingly, the user may select via an interface on the second device the first subset of media to add to the queue. In one case, receiving data indicating the addition of the first subset of media may involve receiving URLs associated with each media in the first subset of media.

In one example, the first subset of media and the second subset of media may be stored on the second device. In other words, the media content data for the media may be stored on a data storage medium of the second device. In another example, the first subset of media and second subset of media are stored remotely and may be accessed by the second device. For instance, the media on the second device may be media provided by media services such as RHAPSODY™ or SPOTIFY™, and may be accessed via an application on the second device. In this case, URLs for the media may be stored on the second device. In a further example, the media on the second device may be a mix of media stored locally and media provided by media services.

At block 806, the method 800 may involve providing second media availability data indicating second media available for access by the first device. In one example, the second media comprises the first subset of media and does not comprise the second subset of media. As discussed above, only the first subset of media selected to be added to the queue may be available to the first device, while the second subset of media remains private. In this case, the second media available for access by the first device, and therefore available for rendering by the first device may include the first subset of media, and not the second subset of media from the second device.

Figure 9B:
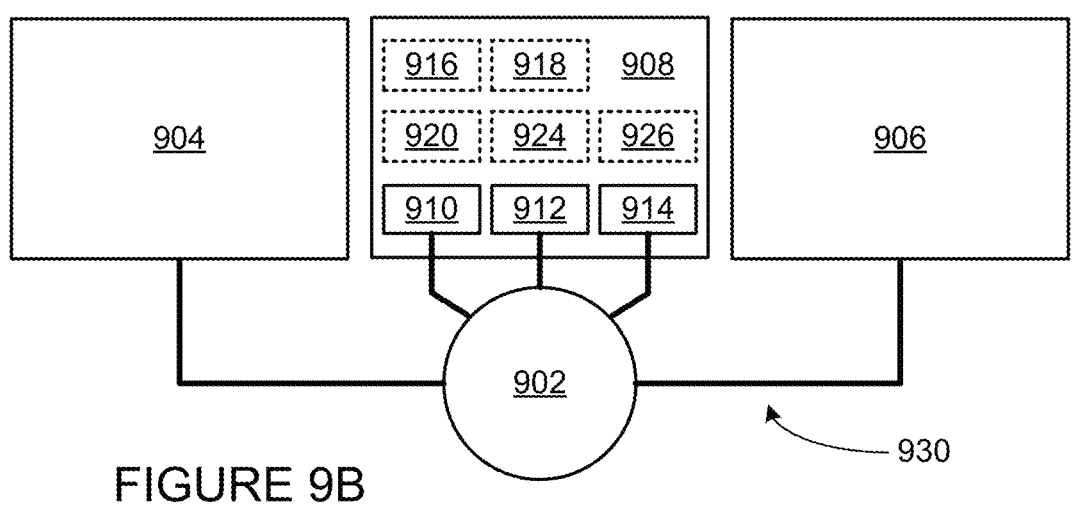
FIG. 9B shows an example block diagram representing a second media accessibility.

FIG. 9B shows an example block diagram representing second media accessibility 930. The second media availability 930 includes the device 902 and media sources 904 and 906 discussed above in connection to FIG. 9A, as well as a media source 908, which in this case may be the second device (personal device). In this example, the first subset of media from the media source 908 may include media 910, 912, and 914, and the second subset of media from the media source 908 may include media 916, 918, 920, 924, and 926. As shown, the device 902 may be connected directly to media 910, 912, and 914 in the first subset of media rather than to the media source 908 as a whole, and therefore may not be connected to media 916, 918, 920, 924, and 926 in the second subset of media. As such, the device 902 may have access to media 910, 912, and 914, and not to media 916, 918, 920, 924, and 926. Referring back to block 806, the second media availability data may therefore indicate that the second media, including media 910, 912, and 914, is available for access by the first device.

As discussed above, media on the second device may be media stored locally or media provided by media services accessible by the second device. In the case media in the first subset of media is stored locally on the second device, adding the media to the queue may involve providing a URL to the media on the second device to the device 902. In the case media in the first subset of media is provided by a media service, adding the media to the queue may involve forwarding a URL of the media on the media service to the device 902.

Note that while media 916, 918, 920, 924, and 926 are shown in FIG. 9B, this second subset of media is only provided for illustrative purposes, and may be, in implementation, completely invisible to the first device. In other words, not only is the second subset of media that was not selected by the user of the second device to be added to the queue inaccessible by the first device, the second subset of media may not even be viewable by the first device.

In connection to FIG. 10A discussed above, FIG. 10B shows an example second interface 1200 of the first device in the media system 100 after the second subset of media has been added to the queue. As shown, additional media information 1006 is provided under the "AVAILABLE SONGS" section in addition to the available media information 1004. In this case, the additional media information 1006 may reflect the second subset of media added from the second device. As indicated previously, the second device may be a personal device such as a mobile media player or mobile phone having media rendering capabilities. In such a case, symbols 1008 may also be provided on the interface 1200 next to the additional media information 1006 to indicate that media associated with the additional media information 1006 may be from a mobile device.

As mentioned above, the user may leave the vicinity of the media system 100 or may shut off or disconnect from the network the second device, resulting in the second device no longer being in communication with the media system 100. Accordingly, the URLs provided to the media system 100 when the first subset of media was added to the queue may no longer be valid. At block 808, the method 800 may involve initiating a query for equivalent media of the first subset of media on media sources accessible by the first device. In one example, the query for equivalent media may be for the purpose of substituting the first subset of media content with the equivalent media in case the first subset of media content is no longer accessible by the first device of the media system 100 due to the second device being disconnected from the media system 100.

In one example, initiating the query for equivalent media of the first subset of media may involve determining that a strength of communication with the second device is below a threshold. For instance, a received signal strength indicator (RSSI) for communication signals received from the second device may be monitored, and a threshold signal strength may be predetermined as the minimal signal strength preferred for secure and reliable communication with the second device. As such, when the signal strength falls below the threshold signal strength, communication with the second device may become insufficiently reliable and access to media on the second device may no longer be available.

FIG. 10C shows an example third interface 1400 of the first device in the media system 100. As shown, the interface 1400 includes additional media information 1016 reflecting the second subset of media added from the second device similar to that of additional media information 1006 of the interface 1200 of FIG. 10B. In this case, however, text of the additional media information 1016 may be greyed out as shown to indicate that access to the media represented by the additional media information 1016 may be unreliable or unavailable.

Referring back to block 808, query for equivalent media may be initiated to remedy the reduced access to media on the second device. In one example, metadata associated with each media in the second media may be provided to the media system 100 when the first subset of media from the second device is added to the queue. As such, equivalent media may be searched for according to the provided metadata. The equivalent media may be searched for on any media source accessible by the media system 100, including local storage mediums, or remote media servers associated with media services, as discussed above.

In one example, the equivalent media may include media matching the media in the second media exactly, such as a copy of the same media. For example, the same version of a song by an artist may be available through a media service as well as the second device. For instance, the song may be accessed by the second device through a media service the media system 100 can also access. Accordingly, a URL to the song accessed directly by the media system 100 may represent equivalent media to a URL to the song as accessed by the second device. In some cases, media matching the media in the second media may not be available. For example, a song from the second device that was added to the media system 100 may be a rare live version of a song that was only released as part of an exclusive limited edition collector's box set. In this example, equivalent media may include other live versions of the song, or studio versions of the song by the same artist.

Figure 9C:
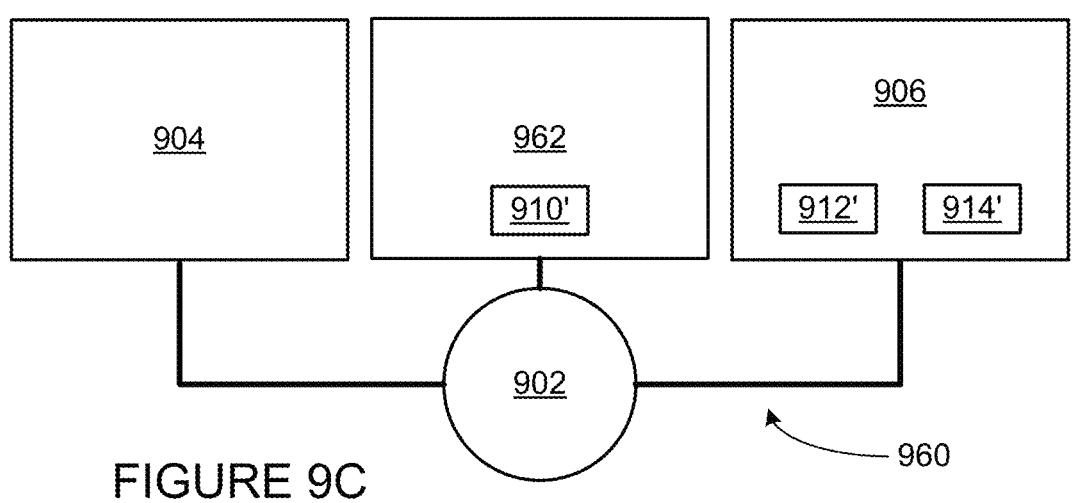
FIG. 9C shows an example block diagram representing a third media accessibility.

At block 810, the method 800 may involve replacing some or all of the first subset of media in the queue with the equivalent media. In one example, replacing the first subset of media in the queue with the equivalent media may allow a user of the media system 100 to continue to experience media identical to or at least similar to the first subset of media which may otherwise be unavailable if the second device is disconnected from the media system 100. FIG. 9C shows an example block diagram representing third media accessibility 960. The third media availability 960 may include the device 902 and media sources 904 and 906 discussed above in connection to FIGS. 9A and 9B. However, in contrast to the second media accessibility 930 of FIG. 9B, the media source 908 may no longer be available because the second device associated with the media source 908 may have been disconnected from the device 902. As shown, the media source 906 may include media 912' and 914' which may be equivalent media to media 912 and 914 from the now disconnected second device. As such, the device 902 may access the equivalent media 912' and 914' on the media source 906. Also shown is a media source 962 with media 910', which may be equivalent media to media 910 from the now disconnected second device. In this example, equivalent media to media 910 may not be available on media sources 904 and 906, but may be available on media source 962. As such, the device 902 may access media 910' on media source 962.

FIG. 10D shows an example fourth interface 1600 of the first device in the media system 100. The interface 1600 may include equivalent media information 1026 reflecting equivalent media replacing the second subset of media previously added from the second device but that has become unavailable. As shown, a symbol 1018 may be provided on the interface 1600 next to Song Title 6 of the equivalent media information 1026 indicating that media associated with Song Title 6 of the equivalent media information 1026 may not be an exact match, but rather a similar version of media corresponding to Song Title 6 of the additional media information 1016 of FIG. 10C. On the other hand, Song Title 7 in the equivalent media information 1026 may correspond to media that exactly matches media corresponding to Song Title 7 in the additional media information 1016 of FIG. 10C, and may therefore not have an adjacent symbol like the symbol 1018.

As the method 800 as described above in connection to FIG. 8 provides just one example method for mobile source media content access, other embodiments within the scope of the present application, including variations of the method 800 are also possible. For instance, a query for equivalent media may be initiated for the first subset of media when the first subset of media is originally added to the media system 100 from the second device, given that the second device is a mobile device expected to be disconnected from the media system 100 at some future time.

In another instance, query for equivalent media may only be initiated if media in the first subset of media added to the queue has been further added to a playlist and expected to be rendered at some future time. In this instance, query for equivalent media may be initiated if media in the first subset of media is unavailable at a certain time prior to when the media is expected to be rendered. For example, if media in the first subset of media has been added to a playlist, a query for equivalent media may only be initiated if the media is unavailable due to disconnection of the second device five minutes before when the media is expected to be rendered. In this case, if the second device was previously disconnected, a query for equivalent media may not be initiated if the second device reconnects at least five minutes before the media is expected to be rendered.

In further examples, a notification may be sent to the second device if the strength of communication between the second device and the media system 100 is below the predetermined threshold. In one case, the notification may be sent via a different communication means than a regular means of communication between the second device and the media system 100. For example, the regular means of communication between the second device and the media system 100 may involve a local wireless network as discussed above. In this case, if the communication signal strength between the second device and the media system 100 over the local wireless network is below the predetermined threshold, a notification may be sent from the media system 100 to the second device over a cellular network.

In one example, the notification may be sent via a notification service, such as an Apple Push Notification service (APNs). The APNs may be configured to propagate push notifications to devices having applications registered to receive those notifications. Each device may establish an accredited and encrypted IP connection with the service and receive notifications over this persistent connection. Providers may connect with APNs through a persistent and secure channel while monitoring incoming data intended for their client applications. When new data for an application arrives, the provider prepares and sends a notification through the channel to APNs, which pushes the notification to the target device.

In one example, the notification may indicate to a user of the second device that the second device is no longer in reliable communication with the media system 100. In this case, if the user carrying the second device traveled out of communicative range of the media system 100 unintentionally, the user may have an opportunity to travel back within communicative range. As pertinent to the present application, example notifications may include "Someone would like to play music from your device," "The playback queue for the Living Room will be playing content sourced from your device soon," "Playback is currently paused in the Kitchen, waiting for access to your portable device," and so on.

In one instance, a notification may be sent after equivalent media has been found and used to replace media in the no longer available subset of media. In this instance, the notification may serve informative purposes. In another instance, as described above, a notification may be sent upon disconnection of the second device from the media system 100. In this case, the user carrying the second device may have a predetermined duration of time by which to reconnect the second device to the media system 100. If the second device was not reconnected to the media system 100 within the predetermined duration of time, a query for equivalent media may be initiated. In other words, the notification may be provided to solicit feedback (either explicitly or in this case, implicitly) based upon to determine subsequent actions, such as initiating a query for equivalent media.

VIII. Conclusion

The descriptions above disclose various example systems, methods, apparatus, and articles of manufacture including, among other components, firmware and/or software executed on hardware. However, such examples are merely illustrative and should not be considered as limiting. For example, it is contemplated that any or all of these firmware, hardware, and/or software components can be embodied exclusively in hardware, exclusively in software, exclusively in firmware, or in any combination of hardware, software, and/or firmware. Accordingly, while the following describes example systems, methods, apparatus, and/or articles of manufacture, the examples provided are not the only way(s) to implement such systems, methods, apparatus, and/or articles of manufacture.

As provided in the embodiments discussed above, the present application enables a user to selectively add media from a personal device to a queue accessible by other devices in a media system. In one aspect, a method is provided. The method involves providing first media availability data. The first media availability data indicates first media available for access by a first device. The method further involves receiving from a second device having access to a first subset of media and a second subset of media, data indicating an addition of the first subset of media to a queue accessible by the first device, and providing second media availability data indicating second media available for access by the first device. The second media comprises the first media and the first subset of media and does not comprise the second subset of media.

In another aspect, a system is provided. The system includes at least one processor, a non-transitory computer readable medium, and program instructions stored on the non-transitory computer readable medium. The program instructions are executable by the at least one processor to perform functions including providing first media availability data. The first media availability data indicates first media available for access by a first device. The functions further include receiving from a second device having access to a first subset of media and a second subset of media, data indicating an addition of the first subset of media to a queue accessible by the first device, and providing second media availability data indicating second media available for access by the first device. The second media comprises the first media and the first subset of media and does not comprise the second subset of media.

In yet another aspect, a non-transitory computer readable medium having instructions stored thereon is provided. The instructions are executable by a computing device to cause the computing device to perform functions including providing first media availability data. The first media availability data indicates first media available for access by a first device. The functions further include receiving from a second device having access to a first subset of media and a second subset of media, data indicating an addition of the first subset of media to a queue accessible by the first device, and providing second media availability data indicating second media available for access by the first device. The second media comprises the first media and the first subset of media and does not comprise the second subset of media.

Additionally, references herein to "embodiment" means that a particular feature, structure, or characteristic described in connection with the embodiment can be included in at least one example embodiment of the invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible medium such as a memory, DVD, CD, Blu-ray, and so on, storing the software and/or firmware.

The invention claimed is:

1. A computing device comprising:
 least one processor;
 at least one non-transitory computer-readable medium comprising program instructions that are executable by the at least one processor such that the computing device is configured to:

receive, from a first device configured to add media items for playback by a playback device of a media playback system, an instruction to add a first media item to a playback queue associated with the playback device, wherein the first media item is accessible at a first network location at a first source;

based on the instruction, cause the first media item to be added to the playback queue;

after adding the first media item to the playback queue, determine that the first media item is expected to be played back at a future time in which the first media item will no longer be accessible to the playback device;

based on the determination that the first media item is expected to be played back at a time when the first media item will no longer be accessible to the playback device, determine a second media item that is similar to the first media item, wherein the second media item is accessible at a second network location at a second source;

replace the first media item in the playback queue with the determined second media item; and cause the playback device to play back the playback queue.

2. The computing device of claim 1, wherein determining that the first media item is expected to be played back at a future time in which the first media item will no longer be accessible to the playback device comprises:

monitoring a received signal strength indicator (RSSI) for communication signals received from the first device; and determining that a strength of communication with the first device is below a predetermined threshold.

3. The computing device of claim 1, wherein:

the first device comprises a mobile device; and determining that the first media item is expected to be played back at a future time in which the first media item will no longer be accessible to the playback device comprises:

determining that the mobile device is expected to be disconnected from the media playback system at a time in the future.

4. The computing device of claim 1, wherein determining that the first media item is expected to be played back at a future time in which the first media item will no longer be accessible to the playback device comprises:

detecting that the first media item has been added to a playlist, wherein the playlist is expected to be rendered at a time in the future.

5. The computing device of claim 1, wherein determining the second media item that is similar to the first media item comprises initiating a query for the media item that is similar to the first media item based on a determination that the first media item is unavailable at a particular time prior to when the first media item is expected to be rendered.

6. The computing device of claim 1, wherein determining the second media item that is similar to the first media item comprises initiating a query for a particular second media item that is the same version of the first media item.

7. The computing device of claim 1, wherein determining the second media item that is similar to the first media item comprises initiating a query for a particular second media item that is a different version of the first media item.

8. The computing device of claim 1, wherein:

the media playback system comprises at least one additional playback device; and the playback device and the additional playback device are configured to play back the playback queue in synchrony.

9. A non-transitory computer-readable medium having stored thereon instructions executable by one or more processors to cause a computing device to perform functions comprising:

receiving, from a first device configured to add media items for playback by a playback device of a media playback system, an instruction to add a first media item to a playback queue associated with the playback device, wherein the first media item is accessible at a first network location at a first source;

based on the instruction, causing the first media item to be added to the playback queue;

after adding the first media item to the playback queue, determining that the first media item is expected to be played back at a future time in which the first media item will no longer be accessible to the playback device;

based on the determination that the first media item is expected to be played back at a time when the first media item will no longer be accessible to the playback device, determining a second media item that is similar to the first media item, wherein the second media item is accessible at a second network location at a second source;

replacing the first media item in the playback queue with the determined second media item; and causing the playback device to play back the playback queue.

10. The non-transitory computer-readable medium of claim 9, wherein determining that the first media item is expected to be played back at a future time in which the first media item will no longer be accessible to the playback device comprises:

monitoring a received signal strength indicator (RSSI) for communication signals received from the first device; and determining that a strength of communication with the first device is below a predetermined threshold.

11. The non-transitory computer-readable medium of claim 9, wherein:

the first device comprises a mobile device; and determining that the first media item is expected to be played back at a future time in which the first media item will no longer be accessible to the playback device comprises:

determining that the mobile device is expected to be disconnected from the media playback system at a time in the future.

12. The non-transitory computer-readable medium of claim 9, wherein determining that the first media item is expected to be played back at a future time in which the first media item will no longer be accessible to the playback device comprises:

detecting that the first media item has been added to a playlist, wherein the playlist is expected to be rendered at a time in the future.

13. The non-transitory computer-readable medium of claim 9, wherein determining the second media item that is similar to the first media item comprises initiating a query for the media item that is similar to the first media item based on a determination that the first media item is unavailable at a particular time prior to when the media first item is expected to be rendered.

14. The non-transitory computer-readable medium of claim 9, wherein determining the second media item that is similar to the first media item comprises initiating a query for a particular second media item that is the same version of the first media item.

15. The non-transitory computer-readable medium of claim 9, wherein determining the second media item that is similar to the first media item comprises initiating a query for a particular second media item that is a different version of the first media item.

16. The non-transitory computer-readable medium of claim 9, wherein:
the media playback system comprises at least one additional playback device; and
the playback device and the additional playback device are configured to play back the playback queue in synchrony.

17. A method to be performed by a computing device, the method comprising:
receiving, from a first device configured to add media items for playback by a playback device of a media playback system, an instruction to add a first media item to a playback queue associated with the playback device, wherein the first media item is accessible at a first network location at a first source;
based on the instruction, causing the first media item to be added to the playback queue;
after adding the first media item to the playback queue, determining that the first media item is expected to be played back at a future time in which the first media item will no longer be accessible to the playback device;
based on the determination that the first media item is expected to be played back at a time when the first media item will no longer be accessible to the playback device, determining a second media item that is similar to the first media item, wherein the second media item is accessible at a second network location at a second source;
replacing the first media item in the playback queue with the determined second media item; and
causing the playback device to play back the playback queue.

18. The method of claim 17, wherein determining that the first media item is expected to be played back at a future time in which the first media item will no longer be accessible to the playback device comprises:
monitoring a received signal strength indicator (RSSI) for communication signals received from the first device; and
determining that a strength of communication with the first device is below a predetermined threshold.

19. The method of claim 17, wherein:
the first device comprises a mobile device; and
determining that the first media item is expected to be played back at a future time in which the first media item will no longer be accessible to the playback device comprises:
determining that the mobile device is expected to be disconnected from the media playback system at a time in the future.

20. The method of claim 17, wherein determining that the first media item is expected to be played back at a future time in which the first media item will no longer be accessible to the playback device comprises:
detecting that the first media item has been added to a playlist, wherein the playlist is expected to be rendered at a time in the future.

* * * * *

UNITED STATES PATENT AND TRADEMARK OFFICE
CERTIFICATE OF CORRECTION

PATENT NO. : 11,728,907 B2
APPLICATION NO. : 17/659773
DATED : August 15, 2023
INVENTOR(S) : Paul Andrew Bates et al.

It is certified that error appears in the above-identified patent and that said Letters Patent is hereby corrected as shown below:

In the Claims

In Column 22, in Claim 1, Line 63, delete "least" and insert -- at least --, therefor.

Signed and Sealed this
Nineteenth Day of September, 2023

Katherine Kelly Vidal
Director of the United States Patent and Trademark Office